(12) United States Patent
Burriesci et al.

(10) Patent No.: US 11,645,368 B2
(45) Date of Patent: May 9, 2023

(54) HASH-BASED DYNAMIC RESTRICTION OF CONTENT ON INFORMATION RESOURCES

(71) Applicant: Google LLC, Mountain View, CA (US)

(72) Inventors: Matthew Burriesci, Mountain View, CA (US); Harrison Gordon, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/086,277

(22) PCT Filed: Jan. 24, 2017

(86) PCT No.: PCT/US2017/014786
§ 371 (c)(1),
(2) Date: Sep. 18, 2018

(87) PCT Pub. No.: WO2018/125266
PCT Pub. Date: Jul. 5, 2018

(65) Prior Publication Data
US 2019/0130079 A1    May 2, 2019

Related U.S. Application Data

(60) Provisional application No. 62/440,792, filed on Dec. 30, 2016.

(51) Int. Cl.
*G06F 16/22* (2019.01)
*G06F 21/12* (2013.01)
(Continued)

(52) U.S. Cl.
CPC ........ *G06F 21/128* (2013.01); *G06F 16/2255* (2019.01); *G06F 16/955* (2019.01);
(Continued)

(58) Field of Classification Search
CPC .............. G06F 16/955; G06F 16/2255; G06F 16/9577; G06F 21/128; G06F 21/6218;
(Continued)

(56) References Cited

U.S. PATENT DOCUMENTS 9,473,516 B1    10/2016  Jezorek et al.
2002/0016910 A1  2/2002  Wright et al.
(Continued)

FOREIGN PATENT DOCUMENTS

CN    103913174 A    7/2014
CN    106403971 A    2/2017
(Continued)

OTHER PUBLICATIONS

International Preliminary Report on Patentability on Appln. Ser. No. PCT/US2017/014786 dated Jul. 11, 2019 (10 pages).
(Continued)

*Primary Examiner* — Brian F Shaw
(74) *Attorney, Agent, or Firm* — Marshall, Gerstein & Borun LLP

(57) ABSTRACT

Systems and methods for restricting content inserted into information resources are provided herein. A computing device can identify a content element included in an information resource. The computing device can identify a bit stream corresponding to the content element included in the information resource. The computing device can hash the identified bit stream to generate an element identifier corresponding to the content element. The computing device can access a restricted content database using the element identifier. The computing device can modify, responsive to finding the element identifier in the restricted content database, the presentation of the content element on the information resource in accordance with the content restriction policy.

6 Claims, 10 Drawing Sheets

(51) Int. Cl.
  *H04L 9/40*    (2022.01)
  *G06F 16/957*  (2019.01)
  *G06F 16/955*  (2019.01)
  *G06F 21/62*   (2013.01)

(52) U.S. Cl.
  CPC ...... *G06F 16/9577* (2019.01); *G06F 21/6218* (2013.01); *H04L 63/0428* (2013.01); *G06F 2221/0713* (2013.01)

(58) Field of Classification Search
  CPC ......... G06F 21/6245; G06F 2221/0713; H04L 63/0428; H04L 63/123; H04L 63/20; H04L 63/1416; H04L 63/0245; H04N 5/765; H04N 5/85; H04N 7/163; H04N 9/8211; H04N 9/8233; H04N 21/454; H04N 21/812; H04N 21/84
  See application file for complete search history.

(56) References Cited

U.S. PATENT DOCUMENTS

| | | | |
|---|---|---|---|
| 2003/0182420 | A1 | 9/2003 | Jones et al. |
| 2004/0225645 | A1 | 11/2004 | Rowney et al. |
| 2005/0187971 | A1* | 8/2005 | Hassan .................. G06F 16/27 |
| 2005/0259819 | A1* | 11/2005 | Oomen ................ H04N 19/467 380/200 |
| 2007/0198838 | A1 | 8/2007 | Nonaka et al. |
| 2007/0201502 | A1 | 8/2007 | Abramson |
| 2008/0250484 | A1 | 10/2008 | Chong et al. |
| 2009/0300671 | A1* | 12/2009 | Scott ..................... H04L 9/3226 725/27 |
| 2009/0300770 | A1 | 12/2009 | Rowney et al. |
| 2011/0191019 | A1 | 8/2011 | Holsinger et al. |
| 2013/0013705 | A1* | 1/2013 | White ................. H04L 63/0245 709/206 |
| 2014/0283068 | A1 | 9/2014 | Call et al. |
| 2017/0059347 | A1 | 3/2017 | Flier et al. |
| 2017/0314954 | A1 | 11/2017 | Golding et al. |
| 2018/0266845 | A1 | 9/2018 | Moore et al. |
| 2018/0356239 | A1 | 12/2018 | Marco |

FOREIGN PATENT DOCUMENTS

| | | |
|---|---|---|
| CN | 109040960 A | 12/2018 |
| CN | 109073404 A | 12/2018 |
| CN | 109357673 A | 2/2019 |
| DE | 10 2012 007 217 A1 | 10/2013 |
| GB | 2 422 455 A | 7/2006 |
| JP | 2000-222276 | 8/2000 |
| JP | 2005-115453 | 4/2005 |
| KR | 10-2005-0013630 A | 2/2005 |
| KR | 2005-0013630 A | 2/2005 |
| WO | WO-2012/027588 A1 | 3/2012 |

OTHER PUBLICATIONS

International Search Report and Written Opinion for Appln. Ser. No. PCT/US2017/014785 dated May 29, 2017 (16 pages).
International Search Report and Written Opinion for Appln. Ser. No. PCT/US2017/014786 dated May 26, 2017 (16 pages).
Office Action on EP Appln. Ser. No. 17703589.6 dated Mar. 13, 2019 (8 pages).
Notice of Reasons for Rejection for JP Appln. Ser. No. 2019-522570 dated Aug. 17, 2020 (6 pages).
Office Action for KR Appln. Ser. No. 10-2019-7015208 dated Aug. 5, 2020 (12 pages).
Decision of Rejection for KR Appln. Ser. No. 10-2019-7015208 dated Feb. 18, 2021 (9 pages).
Examination Report for EP Appln. Ser. No. 17705510.0 dated Feb. 8, 2021 (8 pages).
Examination Report for IN Appln. Ser. No. 201927015133 dated Mar. 30, 2021 (9 pages).
First Office Action for CN Appln. Ser. No. 201780014528.6 dated May 31, 2021 (20 pages).
Summons to Attend Oral Proceedings issued in European Patent Application No. 17 703 589.6, dated Apr. 23, 2020.
Anonymous: "Cryptographic hash function—Wikipedia", Oct. 30, 2016 (Oct. 30, 2016), XP055429033, Retrieved from the Internet: URL:<https://en.wikipedia.org/w/index.php?>title=Cryptographic_hash_function&oldid±746994333 [retrieved on Nov. 27, 2017].
First Office Action for Chinese Application No. 201980064401.4, dated Aug. 1, 2022.

* cited by examiner

HASH-BASED DYNAMIC RESTRICTION OF CONTENT ON INFORMATION RESOURCES

CROSS REFERENCES TO RELATED APPLICATIONS

This application is a National Stage Application under 35 U.S.C. § 371 of International Patent Application No. PCT/US2017/014786, filed Jan. 24, 2017, titled "HASH-BASED DYNAMIC RESTRICTION OF CONTENT ON INFORMATION RESOURCES," which claims the benefit of priority to U.S. Patent Application No. 62/440,792, filed on Dec. 30, 2016, titled "HASH-BASED DYNAMIC RESTRICTION OF CONTENT ON INFORMATION RESOURCES," each of which is hereby incorporated by reference herein in its entirety.

BACKGROUND

In a computer networked environment, such as the Internet, information resources (e.g., webpages) and the content elements included in such information resources may be parsed and rendered by an application (e.g., web browser) executing on a client device. The information resource and the content elements thereon may be transmitted from different servers via the computer networked environment to the client device.

SUMMARY

At least one aspect is directed to a method of restricting content inserted into information resources. A computing device having one or more processors can identify a content element included in an information resource to which to apply a content restriction policy for modifying presentation of the content element. The computing device can identify a bit stream corresponding to the content element included in the information resource. The computing device can hash the identified bit stream to generate an element identifier corresponding to the content element. The computing device can access a restricted content database using the element identifier. The computing device can modify the presentation of the content element on the information resource in accordance with the content restriction policy, responsive to finding the element identifier in the restricted content database.

In some implementations, the computing device can access a local restricted content database stored on the computing device using the element identifier. In some implementations, the computing device can transmit, responsive to not finding the element identifier in the local restricted content database, to a remote device, a request to find the element identifier on a remote restricted content database associated with the remote device. Receipt of the request can trigger the remote device to access the remote restricted content database using the element identifier. In some implementations, the computing device can receive from the remote device a response indicating that the element identifier is on the remote restricted content database associated with the remote device.

In some implementations, the computing device can access a local restricted content database stored on the computing device using the element identifier. The local restricted content database may include a first list of element identifiers to be permitted and a second list of element identifiers to be restricted. In some implementations, the computing device can determine, responsive to not finding the element identifier in the local restricted content database, that the content element is to be modified in accordance with a content rendering restriction extension based on rendering properties of the content element and the information resource. In some implementations, the computing device can insert the element identifier into the second list included in the local restricted content database responsive to determining that the content restriction policy is to be applied to the content element in accordance with the content rendering restriction extension. In some implementations, the computing device can transmit the element identifier into a remote restricted content database responsive to determining that the content restriction policy is to be applied to the content element in accordance with the content rendering restriction extension.

In some implementations, the computing device can access a local restricted content database stored on the computing device using the element identifier. In some implementations, the computing device can transmit, responsive to not finding the element identifier in the local restricted content database, to a remote device, a request to find the element identifier on a remote restricted content database associated with the remote device. The receipt of the request can trigger the remote device to access the remote restricted content database using the element identifier. The receipt of the request can trigger the remote device to determine, responsive to not finding the element identifier in the remote restricted content database, that the content element is to be modified in accordance to a content rendering restriction extension based on rendering properties of the content element and the information resource. The receipt of the request can trigger the remote device to insert the element identifier into the remote restricted content database responsive to determining that the content restriction policy is to be applied to the content element in accordance with the content rendering restriction extension. In some implementations, the computing device can receive, from the remote device, a response indicating that the element identifier is on the remote restricted content database associated with the remote device.

In some implementations, the computing device can set, responsive to not finding the element identifier on the restricted content database, properties of the content element to default values during a first inclusion of the content element on the information resource. In some implementations, the computing device can determine, subsequent to the first inclusion of the content element, that the content element is to be modified in accordance to a content rendering restriction extension based on rendering properties of the content element and the information resource. In some implementations, the computing device can insert the element identifier into the restricted content database responsive to determining that the content restriction policy is to be applied to the content element in accordance to the content rendering restriction extension. In some implementations, the computing device can delete the content element from at least one of the information resource or a second information resource during a second inclusion of the content element subsequent to the first inclusion as specified by the content restriction policy.

In some implementations, the computing device can permit transmission of an acknowledgement response for the content element to a remote server. In some implementations, the computing device can delete the content element from the information resource subsequent to the transmission of the acknowledgement response for the content element to the remote server. In some implementations, the computing device can insert a second content element positioned over the content element on the information resource as specified by the content restriction policy. In some implementations, the computing device can remove the content element from the information resource as specified by the content restriction policy. In some implementations, the computing device can set a visibility property of the content element to null as specified by the content restriction policy. In some implementations, the computing device can identify, from a portion of a byte stream representing the content element, the bit stream corresponding to a portion of the content element.

At least one aspect is directed to a system for restricting content inserted into information resources. The system can include a resource parser executed on one or more processors. The resource parser can identify a content element included in an information resource to which to apply a content restriction policy for modifying presentation of the content element. The resource parser can identify a bit stream corresponding to the content element included in the information resource. The system can include an element hasher executed on the one or more processors. The element hasher can hash the identified bit stream to generate an element identifier corresponding to the content element. The system can include a content restrictor executed on the one or more processors. The content restrictor can access a restricted content database using the element identifier. The content restrictor can modify, responsive to finding the element identifier in the restricted content database, the presentation of the content element on the information resource in accordance with the content restriction policy.

In some implementations, the content restrictor can access a local restricted content database stored on the computing device using the element identifier. In some implementations, the content restrictor can transmit, responsive to not finding the element identifier in the local restricted content database, to a remote device, a request to find the element identifier on a remote restricted content database associated with the remote device. Receipt of the request can trigger the remote device to access the remote restricted content database using the element identifier. In some implementations, the content restrictor can receive, from the remote device, a response indicating that the element identifier is on the remote restricted content database associated with the remote device.

In some implementations, the content restrictor can access a local restricted content database stored on the computing device using the element identifier. In some implementations, the content restrictor can determine, responsive to not finding the element identifier in the local restricted content database, that the content element is to be modified in accordance with a content rendering restriction extension based on rendering properties of the content element and the information resource. In some implementations, the content restrictor can insert the element identifier into the local restricted content database responsive to determining that the content element is to be modified in accordance with the content rendering restriction extension. In some implementations, the content restrictor can transmit the element identifier to a remote restricted content database for storage, responsive to determining that the content element is to be modified in accordance with the content rendering restriction extension.

In some implementations, the content restrictor can access a local restricted content database stored on the computing device using the element identifier. In some implementations, the content restrictor can transmit, responsive to not finding the element identifier in the local restricted content database, to a remote device, a request to find the element identifier on a remote restricted content database associated with the remote device. A receipt of the request can trigger the remote device to access the remote restricted content database using the element identifier. The receipt of the request can trigger the remote device to determine, responsive to not finding the element identifier in the remote restricted content database, that the content element is to be modified in accordance to a content rendering restriction extension based on rendering properties of the content element and the information resource. The receipt of the request can trigger the remote device to insert the element identifier into the remote restricted content database responsive to determining that the content restriction is to be applied to the content element in accordance with the content rendering restriction extension. In some implementations, the content restrictor can receive, from the remote device, a response indicating that the element identifier is on the remote restricted content database associated with the remote device.

In some implementations, the content restrictor can set, responsive to not finding the element identifier on the restricted content database, properties of the content element to default values during a first inclusion of the content element on the information resource. In some implementations, the content restrictor can determine, subsequent to the first inclusion of the content element, that the content element is to be modified in accordance to a content rendering restriction extension based on rendering properties of the content element and the information resource. In some implementations, the content restrictor can delete the content element from at least one of the information resource or a second information resource during a second inclusion of the content element subsequent to the first inclusion as specified by the content restriction policy.

In some implementations, the content restrictor can permit transmission of an acknowledgement response for the content element to a remote server. In some implementations, the content restrictor can delete the content element from the information resource subsequent to the transmission of the acknowledgement response for the content element to the remote server. In some implementations, the content restrictor can insert a second content element positioned over the content element on the information resource as specified by the content restriction policy. In some implementations, the content restrictor can remove the content element from the information resource as specified by the content restriction policy. In some implementations, the content restrictor can set a visibility property of the content element to null as specified by the content restriction policy. In some implementations, the resource parser can identify, from a portion of a byte stream representing the content element, the bit stream corresponding to a portion of the content element.

At least one aspect is directed to a method of deploying countermeasures against scripts interfering with the integrity of information resources. A data processing system having one or more processors can identify a first content element on an information resource previously transmitted to a client device. The first content element can have a first bit stream. The data processing system can determine an interference to a rendering of the first content element of the information resource. The data processing system can generate, responsive to determining the interference to the rendering of the first content element on the information resource, a second content element for a subsequent information resource based on the first content element. The second content element can have a second bit stream different from the first bit stream. The data processing system can transmit to the client device the subsequent information resource, including the second content element. Receipt of the second content element can cause a content restriction script executing on the client device to apply a rendering-based restriction policy responsive to the second bit stream differing from the first bit stream.

In some implementations, the data processing system can identify a first time corresponding to a transmission of the first content element to the client device. In some implementations, the data processing system can identify a second time corresponding to a receipt of an acknowledgment response for the first content element from the client device. In some implementations, the data processing system can determine that a time elapsed between the first time and the second time is greater than a predetermined threshold.

In some implementations, the data processing system can identify a first elapsed time between a first transmission of the first content element and a first receipt of a first acknowledgment for the first content element. In some implementations, the data processing system can identify a second elapsed time between a second transmission of the first content element and a second receipt of a second acknowledgment for the first content element. The second transmission may be subsequent to the first transmission. The second receipt may be subsequent to the first receipt. In some implementations, the data processing system can determine that the second elapsed time is less than the first elapsed time by a predetermined threshold.

In some implementations, the data processing system can determine, subsequent to transmitting the information resource to the client device, an expected time of a receipt of a request for content to insert as the first content element into the information resource. In some implementations, the data processing system can identify an actual time of the receipt of the request for content to insert as the first content element into the information resource. In some implementations, the data processing system can determine that the expected time and the actual time of the receipt of the request for content differ by more than a predetermined threshold.

In some implementations, the data processing system can determine, subsequent to transmitting the information resource to the client device, an expected time of a receipt of an acknowledgment response for the first content element into the information resource. In some implementations, the data processing system can identify an actual time of the acknowledgment response for the first content element into the information resource. In some implementations, the data processing system can determine that the expected time and the actual time of receipt of the acknowledgment response differ by more than a predetermined threshold.

In some implementations, the data processing system can determine that no request for content was transmitted by the client device for insertion as the first content element into the information resource. In some implementations, the data processing system can modify a visual characteristic of the first content element to generate the second content element to cause a change from the first bit stream to the second bit stream. In some implementations, the data processing system can modify a file pathname of the first content element to generate the second content element to cause a change from the first bit stream to the second bit stream. In some implementations, the data processing system can modify an acknowledgment response code of the first content element to generate the second content element to cause a change from the first bit stream to the second bit stream. In some implementations, the data processing system can insert appendage code into the first content element to generate the second content element. The appendage code can be configured to generate the second bit stream to cause a change from the first bit stream to the second bit stream.

At least one aspect is directed to a system for deploying countermeasures against scripts interfering with the integrity of information resources. The system can include an interference detector executed on a data processing system having one or more processors. The interference detector can identify a first content element on an information resource previously transmitted to a client device. The first content element can have a first bit stream. The interference detector can determine an interference to a rendering of the first content element on the information resource. The system can have a content modifier executed on the data processing system. The content modifier can generate, responsive to determining the interference to the rendering of the first content element on the information resource, a second content element for a subsequent information resource based on the first content element. The second content element can have a second bit stream different from the first bit stream. The content modifier can transmit to the client device the subsequent information resource, including the second content element. Receipt of the second content element can cause a content restriction script executing on the client device to apply a rendering-based restriction policy responsive to the second bit stream differing from the first bit stream.

In some implementations, the interference detector can identify a first time corresponding to a transmission of the first content element to the client device. In some implementations, the interference detector can identify a second time corresponding to a receipt of an acknowledgment response for the first content element from the client device. In some implementations, the interference detector can determine that a time elapsed between the first time and the second time is greater than a predetermined threshold.

In some implementations, the interference detector can identify a first elapsed time between a first transmission of the first content element and a first receipt of a first acknowledgment for the first content element. In some implementations, the interference detector can identify a second elapsed time between a second transmission of the first content element and a second receipt of a second acknowledgment for the first content element. The second transmission can be subsequent to the first transmission. The second receipt can be subsequent to the first receipt. In some implementations, the interference detector can determine that the second elapsed time is less than the first elapsed time by a predetermined threshold.

In some implementations, the interference detector can determine, subsequent to transmitting the information resource to the client device, an expected time of a receipt of a request for content to insert as the first content element into the information resource. In some implementations, the interference detector can identify an actual time of the receipt of the request for content to insert as the first content element into the information resource. In some implementations, the interference detector can determine that the expected time and the actual time of the receipt of the request for content differ by more than a predetermined threshold.

In some implementations, the interference detector can determine, subsequent to transmitting the information resource to the client device, an expected time of a receipt of an acknowledgment response for the first content element into the information resource. In some implementations, the interference detector can identify an actual time of the acknowledgment response for the first content element into the information resource. In some implementations, the interference detector can determine that the expected time and the actual time of receipt of the acknowledgment response differ by more than a predetermined threshold. In some implementations, the interference detector can determine that no request for content was transmitted by the client device for insertion as the first content element into the information resource.

In some implementations, the content modifier can modify a visual characteristic of the first content element to generate the second content element to cause a change from the first bit stream to the second bit stream. In some implementations, the content modifier can modify a file pathname of the first content element to generate the second content element to cause a change from the first bit stream to the second bit stream. In some implementations, the content modifier can modify an acknowledgment response code of the first content element to generate the second content element to cause a change from the first bit stream to the second bit stream. In some implementations, the content modifier can insert appendage code into the first content element to generate the second content element. The appendage code can be configured to generate the second bit stream to cause a change from the first bit stream to the second bit stream.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of hash-based dynamic restriction of content and deployment of countermeasures thereto. The various concepts introduced above and discussed in greater detail below may be implemented in any of numerous ways, as the described concepts are not limited to any particular manner of implementation.

For purposes of reading the description of the various embodiments below, the following descriptions of the sections of the specification and their respective contents may be helpful:

Section A describes computer networked environments for hash-based dynamic restriction of content and deployment of countermeasures thereto.

Section B describes systems and methods of restricting content inserted into information resources.

Section C describes systems and methods of deploying countermeasures against scripts interfering with the integrity of information resources.

Section D describes a computing system architecture which may be useful for practicing the systems and methods detailed herein.

Figure 1:
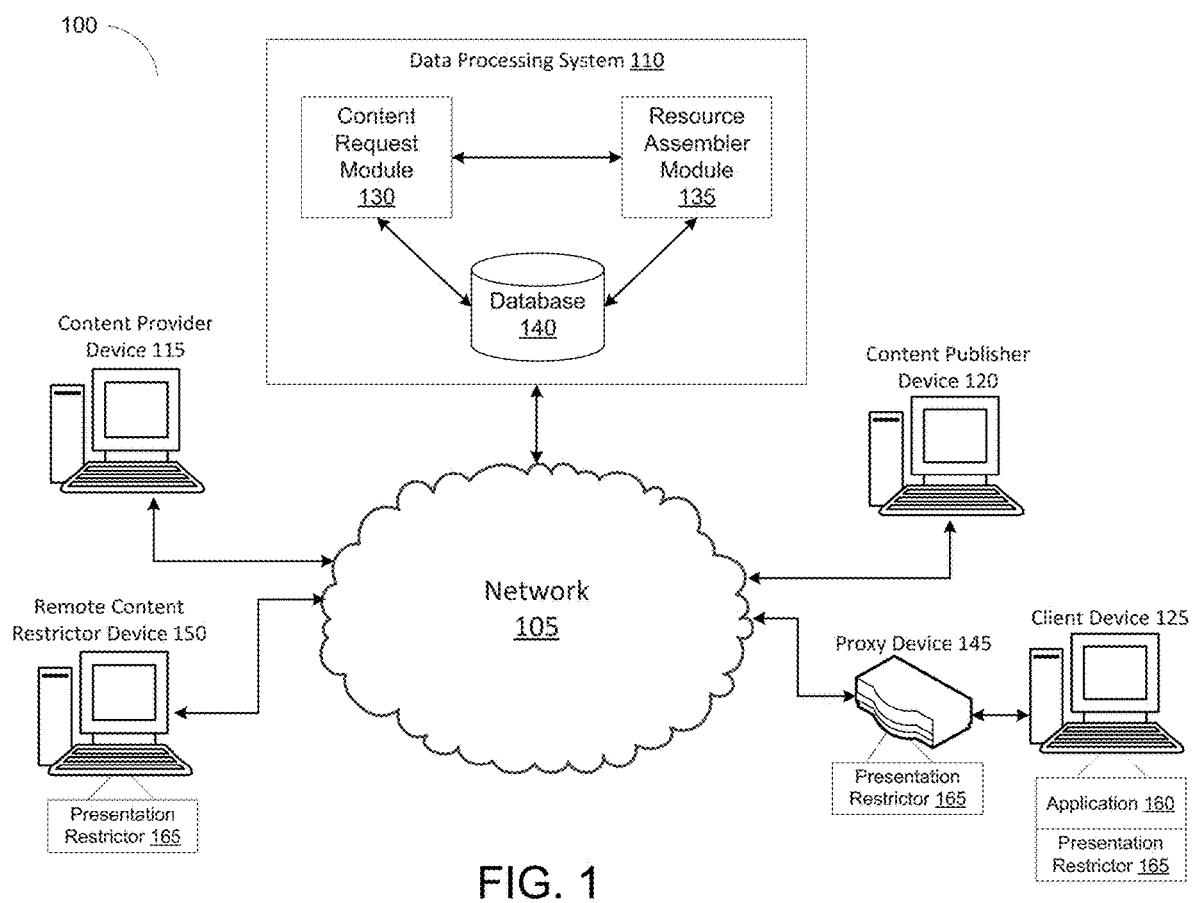
FIG. 1 is a block diagram depicting one implementation of a computer networked environment for hash-based dynamic restriction of content and deployment of countermeasures thereto, according to an illustrative implementation.

A. Computer Network Environment for Hash-Based Dynamic Restriction of Content on Information Resources and Deployment of Countermeasures Thereto FIG. 1 is a block diagram depicting one implementation of an environment for hash-based dynamic restriction of content on information resources and deployment of countermeasures thereto. The environment 100 includes at least one data processing system 110 connected to at least one content provider device 115, at least one content publisher device 120, at least one client device 125, at least one proxy device 145, and at least one remote content restrictor device 115 via the network 105.

In brief overview, upon a request for content from the client device 125, the data processing system 110 can provide an information resource including one or more content elements to the client device 125 via the network 105. The information resource may be retrieved from the content publisher device 120, and the one or more content elements may be obtained from the content provider device 115. The information resource and the content elements thereon may be processed by an application 160 for rendering on the client device 125. In tandem, the remote content restrictor device 150 can use a presentation restrictor 165 to disable or, in some implementations, interfere with the display or rendering of some of the content elements on the information resource provided by the data processing system 110 to the client device 125. The presentation restrictor 165 may be provided to the proxy device 145 and the client device 125 to execute the presentation restrictor 165 on the respective device. To maintain the integrity of the information resource and the content elements thereon, the data processing system 110 can execute countermeasures scripts to generate variants of content elements. By generating variants of the content elements which cause the presentation restrictor 165 to reprocess each of the generated variants, the countermeasure script may degrade the performance of the computing devices executing the presentation restrictor 165 as the presentation restrictor 165 utilizes computing resources of a computing device when reprocessing the generated variants. Additional details of the network 105, the data processing system 110, the content provider device 115, the content publisher device 120, the client device 125, the proxy device 145, the remote content restrictor device 150, and the components thereof are provided herein.

In further detail, the data processing system 110 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer programming language. The data processing system can include one or more computing devices or servers that can perform various functions. In some implementations, the data processing system can include a content placement system configured to host auctions. In some implementations, the data processing system does not include the content placement system but is configured to communicate with the content placement system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider device 115, at least one content publisher device 120, at least one client device 125, or at least one remote content restrictor device 150. The network 105 may be any form of computer network that relays information between the client device 125, data processing system 110, and one or more content sources, such as web servers, amongst others. In some implementations, the network 105 may include the Internet and/or other types of data networks, such as a local area network (LAN), a wide area network (WAN), a cellular network, a satellite network, or other types of data networks. The network 105 may also include any number of computing devices (e.g., computers, servers, routers, network switches, etc.) that are configured to receive and/or transmit data within the network 105. The network 105 may further include any number of hardwired and/or wireless connections. The client device 125 may communicate wirelessly (e.g., via WiFi, cellular, radio, etc.) with a transceiver that is hardwired (e.g., via a fiber optic cable, a CAT5 cable, etc.) to other computing devices in the network 105. The client device 125 may also communicate wirelessly with the computing devices of the network 105 via a proxy device 145 (e.g., router, network switch, or gateway).

The content provider devices 115 can include servers or other computing devices operated by a content provider entity to provide content elements to the content publisher devices 120 or the data processing system 110. The content provided by the content provider device 115 can include third-party content elements for display on information resources, such as a website or web page, that include primary content, e.g., content provided by the content publisher device 120. The content elements can also be displayed on a search results web page. The content elements associated with the content provider device 115 can be displayed on information resources other than web pages, such as content displayed as part of the execution of an application on a smartphone or other client device 125. The content publisher devices 120 or the data processing system 110 in turn can select the content elements of the content provider devices 115. The data processing system 110 can run a content placement process to select the content elements based on various performance metrics of the respective content elements. The content publisher devices 120 or the data processing system 110 can transmit the selected content elements of the content provider computing devices for display on information resources at the client devices 125.

The content publisher devices 120 can include servers or other computing devices operated by a content publishing entity to provide primary content for display via the network 105. For instance, the content publisher device 120 can be managed by a web page operator who provides primary content for display on the web page. The content publisher devices 120 can also provide third-party content received from the content provider devices 115 for display via the network 105. The primary content can include content other than that provided by the content publisher device 120, and the web page can include content slots configured for the display of content elements received by the content publisher devices 120 from the content provider devices 115. For instance, the content publisher device 120 can operate the website of a company and can provide content about that company for display on web pages of the website. The web pages can include content slots configured for the display of content elements such as images, text, videos, or any combination thereof received from the content provider device 115. In some implementations, the content publisher device 120 includes a search engine computing device (e.g. server) of a search engine operator that operates a search engine website. The primary content of search engine web pages (e.g., a results or landing web page) can include results of a search as well as third-party content elements displayed in content slots, such as content elements from the content provider device 115. In some implementations, the content publisher device 120 can include a server for serving video content.

The content publisher devices 120 can select one or more content elements received from the content provider devices 115 to include in an information resource with the primary content for display on client devices 125 via the network 105. The content publisher devices 120 can transmit to client devices 125 content elements received from the content publisher devices 115 along with the primary content, responsive to a request for content from the client devices 125. In some implementations, subsequent to transmitting the primary content, the content publisher devices 120 can transmit to the client devices 125 content elements received from the content publisher devices 115, responsive to a request for additional content from the client devices 125. In some implementations, the content publisher device 120 can receive an initial request for primary content from a client device 125 and in response transmit an information resource including primary content to the client device 125. In some implementations, the data processing system 110 can select one or more content elements received from the content provider devices 115 and select primary content (e.g., body, paragraph, text, video or other elements that may generally span the center of the information resource) received from the content publisher devices 120. The data processing system 110 can generate an information resource using the selected one or more content elements from the content provider devices 115 and the primary content from the content publisher devices 120. Further details regarding functionality of the data processing system 110 generating information resources are described herein below.

The client devices 125 can include computing devices configured to communicate via the network 105 or via the network 105 through the proxy device 145 to display data such as the content provided by the content publisher device 120 (e.g., primary web page content or other information resources) and the content provided by the content provider device 115 (e.g., content elements configured for display in an information resource). The client device 125, the content provider device 115, the content publisher device 120, and the remote content restrictor device 150 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be a communication device through which an end user can submit requests to receive content. The requests can be requests to a search engine, and the requests can include search queries. In some implementations, the requests can include a request to access a web page.

The client devices 125 can execute an application 160. The application 205 can include, for example, an Internet browser, a mobile application, or any other computer program capable of executing or otherwise invoking computer-executable instructions processed by the client device 125, such as the computer-executable instructions included in the information resource or the content elements included in the information resource. The information resource and the content elements included therein can correspond to a script, logic, markup, or instructions (e.g., HyperText Markup Language (HTML), Extensible HyperText Markup Language (XHTML), Extensible Markup Language (XML), Cascading Style Sheets (CSS), and JavaScript, or any combination thereof). The application 205 can include any number of components, such as a document tree generator, rendering tree generator, and a display module, to process the information resource and the content elements included therein. The document tree generator can parse the information resource to generate a Document Object Model (DOM) tree including the content elements of the information resource arranged in an hierarchical manner. Using the DOM tree, the rendering tree generator can generate a rendering tree specifying the visual properties or attributes of the content elements of the information resource. The display module can render and display the information resource onto a display of the client device 125 based on the rendering tree.

The proxy device 145 can include computing devices deployed between the client device 125 and the network 105. The proxy device 145 can be configured to communicate with one or more other computing devices, such as the data processing system 110, content provider devices 115, and content publisher devices 125 via the network 105. The proxy device 145 can be, for example, a router, network switch, gateway, network node, or any other computing device configured to receive and forward data packets from the client device 125 to the network 105 or from the network 105 to the client device 125.

The remote content restrictor device 150 can include servers or other computing devices operated by a content filtering entity (e.g., a script blocker, an ad blocker, an Internet Service Provider (ISP), other content providers, etc.) to provide the presentation restrictor 165 for execution on computing devices connected to the network 105. In some implementations, the remote content restrictor 150 can provide the presentation restrictor 165 for installation and execution at the proxy device 145 or the client devices 125. The presentation restrictor 165 can be installed as a separate application or as an extension to an application executing at the proxy device 145 or the client device 125. The functionalities of the presentation restrictor 165 can be executed at the remote content restrictor device 150, the proxy device 145, and the client device 125 individually or across the remote content restrictor device 150, the proxy device 145, and the client device 125 in conjunction. When executed, the presentation restrictor 165 can modify or change the content elements of the information resource provided to the client device 125 via the network 105.

The client devices 125, the proxy device 145, and the remote content restrictor device 150 can execute the presentation restrictor 165. The presentation restrictor 165 can include any number of modules, components, or databases to modify or change the content elements on an information resource. The presentation restrictor 165 can include at least one processing unit, server, virtual server, circuit, engine, agent, appliance, or other logic device such as programmable logic arrays configured to communicate with other computing devices besides the device executing the presentation restrictor 165 via the network 105. The presentation restrictor 165 can include or execute at least one computer program or at least one script. The presentation restrictor 165 can include combinations of software and hardware, such as one or more processors configured to execute one or more scripts. In some implementations, the presentation restrictor 165 may be an extension, an add-on, or an extension installed to the application 160 executing on the client device 125. In some implementations, the presentation restrictor 165 may be a separate, stand-alone executable interfacing with the application 160.

The content provider devices 115, the content publisher device 120, the client device 125, and the remote content restrictor device 150 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer programming language.

The content provider devices 115, the content publisher devices 120, the client device 125, and the remote content restrictor devices 155 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider devices 115, the content publisher device 120 and the client device 125 (e.g., a built-in display, microphone, etc.) or external to the housing of content provider devices 115, the content publisher device 120, the client device 125 (e.g., a monitor connected to the client device 125, a speaker connected to the client device 125, etc.), and the remote content restrictor devices 155 according to various implementations. For example, the content provider devices 115, the content publisher device 120, the client device 125, and the remote content restrictor devices 155 may include an electronic display, which visually displays web pages using webpage data received from one or more content sources and/or from the data processing system 110 via the network 105.

The data processing system 110 can include at least one server. For instance, the data processing system 110 can include a plurality of servers located in at least one data center or server farm. In some implementations, the data processing system 110 includes a content placement system. The data processing system 110 can include at least one content request module 130, at least one resource assembler module 135, and at least one database 145. The content request module 130 and the resource assembler module 135 each can include at least one processing unit, server, virtual server, circuit, engine, agent, appliance, or other logic device such as programmable logic arrays configured to communicate with the database 145 and with other computing devices (e.g., the content provider device 115, the content publisher device 120, or the client device 125) via the network 105.

The content request module 130, the resource assembler module 135, the resource assembler module 140, can include or execute at least one computer program or at least one script. The content request module 130 and the resource assembler module 135 can be separate components, a single component, or part of the data processing system 110. The content request module 130 and the resource assembler module 135 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include information resources and content elements to be included in information resources, among others, to serve to a client device 125. Additional details of the data stored in the database 145 are detailed below.

The content request module 130 can receive a request for content from the client device 125. The request for content can include a request for an information resource or a request for a content element for the information resource. The request for content can include a device identifier corresponding to the client device 125. The request for content can include an application profile identifying an application executing on the client device 125. The request for content can include an identifier for the information resource or the content element. For example, the request for content can include a Uniform Resource Locator (URL) referring to a specific resource, such as a webpage (e.g., "https://www.example.com/homepage.html"). The hostname of the URL for the information resource may differ from the hostname of the URL for the content element. For example, the URL for the information resource can be "https://www.example_publisher.com/index.html," but the URL for the content element can be "https://www.example_thirdparty.com/content_item_271828.html." The URL for a request for a content element can include a host page that is the same as the URL for the information resource. For example, the URL for the information resource can be "https://www.example.com/index.html," but the URL for the content element can be "https://www.example.com/content_item_978.html." The content request module 130 can also parse the request for content for additional data.

In response to receiving the request for content from the client device 125, the resource assembler module 135 can transmit the information resource or the content elements for the information resource based on the address or the identifier of the request. The resource assembler module 135 can identify the information resource and the content element included in the request for content based on the address or the identifier. The resource assembler module 135 can access the database 145 to select the information resource and the content elements identified by the address or identifier. In some implementations, the resource assembler module 135 can transmit a request to the content provider 115 or the content publisher 120 to access, retrieve, or otherwise receive the information resource or content element identified by the address or identifier.

The resource assembler module 135 can transmit the information resource of the content elements for the information resource to the client device 125 based on a redirect from the content publisher device 120 or the content provider device 115. The content publisher device 125 can also configure the domain or address such that requests to access the information resources maintained by the content publisher device 125 are directed to the data processing system 110. The content request module 130 can receive the request to retrieve or access the information resource of the content publisher device 125. In some implementations, the request can include a device identifier or other information that the resource assembler module 135 can use to select content that is relevant to the request of the client device from which the request was received (e.g., using the content placement system). The resource assembler module 135 may access the content provider device 115 or any other server or device that maintains content elements on behalf of the content provider device 115.

The resource assembler module 135 can transmit the content to the client device 125 on behalf of one or more content publisher devices 120 and the content provider devices 115. The resource assembler module 135 can transmit or forward the information resource or content element identified by the address or identifier to the client device 125. For example, the data processing system 110 can receive from a client device 125 a request for an information resource or the content element. The request may include an address referring to one of the content publisher devices 120 and one of the content provider devices 115. In this example, the resource assembler module 135 can forward the request for the information resource to the respective content publisher 120. The resource assembler module 135 can also transmit a request for content elements to insert into the information resource to the respective content provider device 115. Upon receiving the information resource from the respective content publisher 120 and the content elements from the respective content provider device 115, the resource assembler module 135 can forward the content document to the client device 125 associated with the original request.

The resource assembler 135 can generate an information resource including one or more content elements. In some embodiments, the resource assembler 135 can modify an existing information resource maintained by the content publisher device 125 to insert content elements provided by the content provider device 115. In some implementations, the resource assembler 135 can generate a new information resource to include content elements from the content publisher device 125 and the content provider device 115. A subset of the content elements of the information resource may include primary content from the content publisher device 120. Another subset of the content elements of the information resource may include third-party content from the content provider device 115. The primary content and the third-party content can include, for example, text content elements, image content elements, and video content elements, among others. The third-party can include an embedded link to redirect the client device 125 to retrieve content from the content provider device 115 or the content publisher device 120 corresponding to an address of the link. A source address (e.g., URL) of the primary content may be initially different from a source address of the third-party content. In some implementations, the resource assembler 135 can modify the source addresses of the content elements for the primary content and the third-party content to be of the same source address. In some implementations, the content publisher device 120 can execute or host the resource assembler 135.

In tandem, the presentation restrictor 165 executing at the remote content restrictor device 150, the proxy device 145, or the client device 125 can attempt to modify or change the content elements of the information resource. The presentation restrictor 165 can also insert additional content elements to the information resource to obscure the identified content element. In some implementations, the presentation restrictor 165 can cause the presentation of the identified content element to be modified such that the content element is presented in a format different from an original presentation format. The data processing system 110 in turn can deploy countermeasures against the presentation restrictor 165 to maintain the integrity of the information resources and content elements transmitted across the network 105.

B. Systems and Methods of Restricting Content Inserted into Information Resources Information resources can include one or more content elements (e.g., inline frames, images, and sections, among others). Content elements can define the visual content makeup of the information resource. For example, the information resource can include primary content (e.g., body text) and a content element including an image. An application (e.g., a web browser) can use such content elements to process, render, and display the information resource on a display of a computing device. Some of these content elements may originate from a server that is different from the server providing the information resource. As such, information resources with such content elements may suffer from security vulnerabilities. For example, a proxy device may intercept the content elements originally intended for the information resource and replace the intercepted ones with its own content elements. Such content elements may include malicious code, such as malware, Trojans, and viruses. In addition, from a human-computer interaction (HCI), these content elements may interfere with the user's ability to read or view the primary content of the information resource, even without the injection of malicious code. For instance, one content element may be of a color different from all the remaining content elements on the information resource, thereby causing the user to be distracted from the primary content or other content elements.

Content elements may be disabled from inclusion or display on information resources using a number of techniques. One technique may be to identify that the content element is from a source different from the remainder of the information resource using source addresses. This technique, however, may be unable to identify such content elements if the source address for the content element is the same as the information resource or if there is no separate request for the content element to insert into the information resource. Another technique may be to identify content elements using image processing techniques to detect differences between the content elements and the underlying information resource. Such techniques, however, may be computationally expensive, resulting in lag and degradation of computer performance.

To address these and other technical challenges, the system proposed herein can leverage hashing functions to identify and disable content elements. Compared to image processing algorithms, hashing functions may be less computationally complex and may thus take up less computing processing power. A computing device executing a presentation restriction script can identify which content elements on an information resource to disable. For each content element, the client device may identify the corresponding bit stream. The computing device can then calculate a hash value using the corresponding bit stream as the input parameter for the hashing function to generate an element identifier.

The computing device can then access a database, either locally or on a server, of known restricted content elements with the calculated element identifier and can apply a content restriction policy based on whether the element identifier is found. If the element identifier is found in the database, the computing device can remove the respective content element from the information resource. On the other hand, if the element identifier is not found, the client device can apply image processing algorithms to the content element to determine whether to remove the content element from the information resource. The computing device can also transmit the element identifier to the server to determine whether the element identifier is on the database of restricted content elements stored at the server. Once received, the server may also perform the image processing algorithms. The computing device can therefore perform an initial analysis of a content element using techniques that have relatively low processor and memory requirements. In addition, the server can be used to perform relatively processor-intensive techniques such that high accuracy identification of content elements may be provided, without the use of processor-intensive techniques for all content elements, or any highly processor-intensive techniques to be performed at the client device. With this technique, the reliance on image processing techniques to detect content elements may be reduced. Furthermore, as calculating hash functions consume less computing power than image processing algorithms, the processor and memory of the computing device and of the server may be freed up for other functions.

Figure 2:
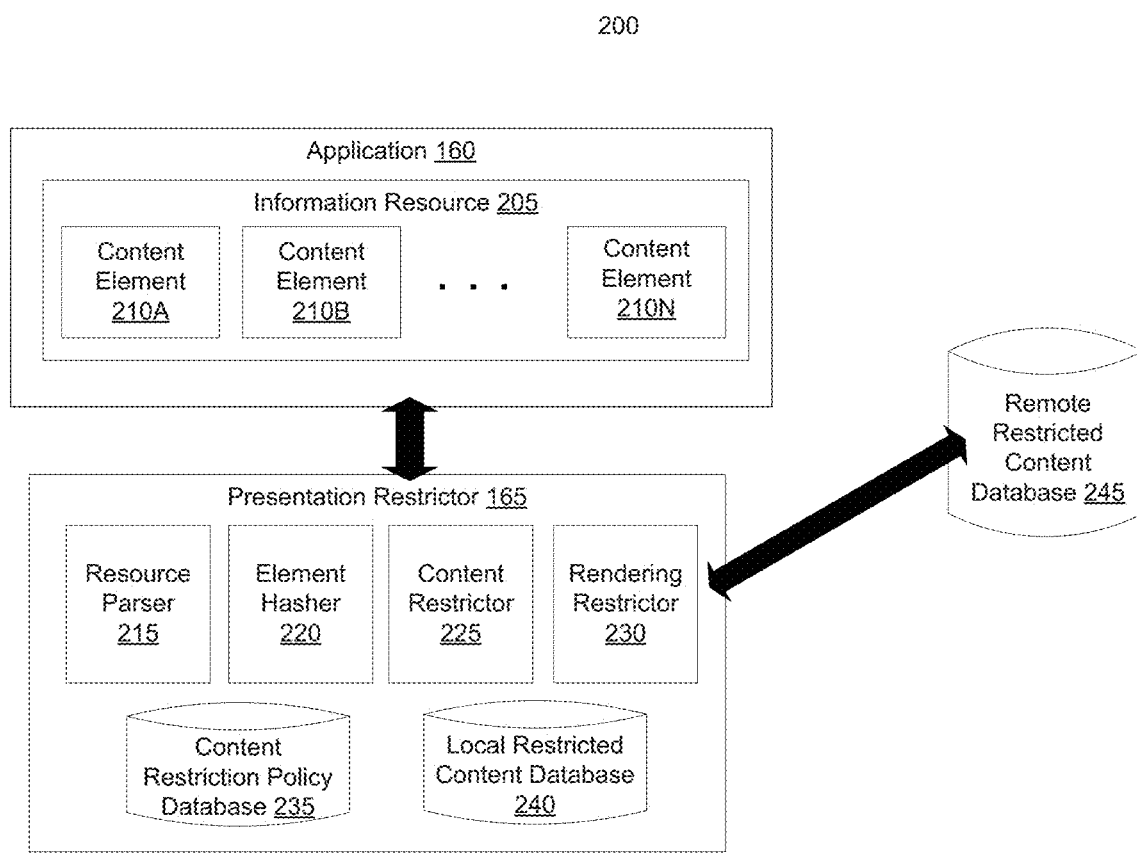
FIG. 2 is a block diagram depicting a system for restricting content inserted into information resources, according to an illustrative implementation.

Referring to FIG. 2, FIG. 2 is a block diagram depicting a system 200 for restricting content inserted into information resources. The system 200 may be a detailed view of the application 160 and the presentation restrictor 165 as described in system 100 in the context of FIG. 1. In overview, the system 200 can include the application 160, the presentation restrictor 165, and a remote restricted content database 245. The application 160 may be executed on the client device 125, and can include an information resource 205 received from the data processing system 110 or the content publisher device 120. The information resource 205 can include one or more content elements 210A-N. The presentation restrictor 165 can be executed on a computing device, such as the client device 125, the proxy device 145, or the remote content restrictor device 150, individually or in conjunction. The presentation restrictor 165 can include a resource parser 215, an element hasher 220, a computing device, a rendering restrictor 230, a content restriction policy database 235, and a local restricted content database 240. The presentation restrictor 165 may be in communication with a remote restricted content database 245.

In further detail, the resource parser 215 can identify a content element 210A-N included in the information resource 205 to which to apply a content restriction policy for modifying presentation of the content element 210A-N. The content restriction policy may be stored at the content restriction policy database 235 and be maintained by the presentation restrictor 165. The content restriction policy may specify which element types of content elements 210A-N are to be further analyzed and how to modify content elements 210A-N identified as restricted. The resource parser 215 can interface with the application 160 to access the information resource 205 and the content elements 210A-N included in the information resource 205.

The content restriction policy applied by the presentation restrictor 165 may specify how identified content elements 210A-N or the information resource 205 including such content elements 210A-N are to be modified, changed, or disabled. Details regarding the modification of the content elements 210A-N and the information resource 205 including the content element 210A-N are described herein below. The content restriction policy may be specific to a particular domain of the content provider device 115 or the content publisher device 120. The content restriction policy may be specific to a particular client device 125. The content restriction policy may be specific a particular account identifier or user profile associated with one or more client devices 125. The content restriction policy may be specific trait information of the user profile associated with the one or more client devices 125. The content restriction policy may be specific to a particular application 160 (e.g., mobile application, certain web browsers, etc.) executing at the client device 125. The content restriction policy may be specific to any interfacing programs (e.g., plug-ins, add-ons, etc.) to the application 160 executing at the client device 125.

In accordance with the content restriction policy, the resource parser can identify a subset of content elements 210A-N included in the information resource 205 for further analysis. The resource parser 215 can identify an element type for each content element 210A-N included in the information resource 205. The element type may include one of body, paragraph, division, section, inline frame, image, canvas, applet, script, audio, video, table, and list, among others. The element type may correspond to an HTML tag (e.g., "<iframe>" for inline frames). In some implementations, the content restriction policy may specify an element type to be further analyzed (e.g., inline frames, images, applets, etc.). The resource parser 215 can identify the subset of content elements 210A-N matching the element type to be further analyzed as specified in the content restriction policy. In this manner, the presentation restrictor 165 may reduce the number of content elements 210A-N to be processed, thereby freeing up computing resources.

To determine whether the content restriction policy is to be applied to the content element 210A-N, the resource parser 215 can identify a bit stream corresponding to the content element 210A-N included in the information resource 205. The information resource 205 may correspond to a binary sequence (e.g., byte array or byte stream). Each content element 210A-N included in the information resource 205 may correspond to a portion of the binary sequence. In some implementations, the resource parser 215 can interface with the application 160 to access the binary sequence corresponding to the information resource 205. In some implementations, the resource parser 215 can interface with the application 160 to access the portion of the binary sequence corresponding to one of the content elements 210A-N. In some implementations, the resource parser 215 can interface with the application 160 to access the portion of the binary sequence corresponding to the subset of content elements 210A-N identified as matching the element type to be further analyzed as specified by the content restriction policy. In some implementations, the resource parser 215 can identify a subset portion of the bit stream of the content element 210A-N (e.g., the first N number of bits in the bit stream or every fifth bit in the bit stream, etc.).

With the resource parser 215 having identified the whole bit stream for the content element 210A-N, the element hasher 220 can hash the identified bit stream to generate an element identifier corresponding to the content element 210A-N. In some implementations, the element hasher 220 may use a hashing function on the identified bit stream to generate the element identifier corresponding to the content element 210A-N. The hashing function may include any combination of the bit stream identified for the content element 210A-N, such as cryptographic hashing functions (e.g., Secure Hash Algorithms (SHA-1, SHA-2, and SHA-3), Message-Digest Algorithms (MD2, MD4, MD5, and MD6), checksum functions, etc.), cyclic redundancy check algorithms, hash tables (e.g., an associative array), and geometric hashing functions, or any one-to-one hashing function, among others. The hashing function may be configured or selected to minimize hash collisions, such that the likelihood that the same element identifier identifying two different content elements 210A-N is decreased. In some implementations, the element hasher 220 can hash a subset portion of the bit stream of the content element 210A-N.

In some implementations, the hashing function used by the element hasher 220 may be common across all instantiations of the presentation restrictor 165 (e.g., across the remote content restrictor 150, the proxy device 145, and the client devices 125). For the same content element 210A-N, one instantiation of the element hasher 220 at one computing device (e.g., the remote content restrictor 150, the proxy device 145, or one of the client devices 125) can generate the same element identifier as another instantiation of the element hasher 220 at another computing device. In this manner, the element hasher 220 can generate a single element identifier to identify the same content element 210A-N transmitted over the network 105 to computing devices (e.g., other client devices 125, the proxy device 145, and the remote content restrictor device 150) connected thereto executing the presentation restrictor 165. By having a single element identifier for the same content element 210A-N, computing devices executing the presentation restrictor 165 may avoid running more computationally expensive algorithms (e.g., image processing algorithms) to determine whether the content restriction policy is to be applied to the content element 210A-N.

In some implementations, the hashing function used by the element hasher 220 may be unique to a local instantiation of the presentation restrictor 165 (e.g., at the client device 125). For the same content element 210A-N, one instantiation of the element hasher 220 at one computing device (e.g., the remote content restrictor 150, the proxy device 145, or one of the client devices 125) can generate an element identifier different from an element identifier generated by another instantiation of the element hasher 220 executed at another computing device. The element hasher 220 can generate an element identifier unique to the local instantiation of the presentation restrictor 165. By using a hashing function unique to the local instantiation of the presentation restrictor 165, the element hasher 220 can enhance data security and encryption, as well as user privacy.

In some implementations, the hashing function used by the element hasher 220 can account for any encryption algorithm of the binary sequence corresponding to the information resource 205 or the content element 210A-N. The client device 125, the proxy device 145, or any intermediary device can apply an encryption algorithm to the binary sequence corresponding to the information resource 205 or the content element 210A-N, thereby altering the binary sequence. In some implementations, the encryption algorithm applied to the binary sequence may include Wired Equivalent Privacy (WEP) and Wi-Fi Protected Access (WPA), among other cryptographic protocols. Due to the encryption algorithm, the element hasher 220 executing at one computing device can generate an element identifier different from an element identifier generated by the element hasher 220 executing at another computing device. To bypass or nullify the effects of the encryption algorithm applied to the binary sequence, the element hasher 220 can use a one-to-one hashing function to generate an element identifier for each identified bit stream. In this manner, although the element identifier generated by the element hasher 220 may be unique to the local instantiation of the presentation restrictor 165, the encryption algorithm applied by the client device 125, the proxy device 145, or any other intermediary device may result in a unique value. As such, the element identifier generated by the element hasher 220 at one instantiation of the presentation restrictor 165 may be used across other instantiations of the presentation restrictor 165 at other devices.

Using the element identifier generated by the element hasher 220, the content restrictor 225 can access the local restricted content database 240 or the remote restricted content database 245 to determine whether to apply the content restriction policy to the content element 210A-N. The local restricted content database 240 may be maintained by an instantiation of the presentation restrictor 165 local to a computing device executing the element hasher 220, such as the client device 125 or the proxy device 145. The local restricted content database 240 can include any data structure (e.g., array, heap, linked list, binary tree, matrix, table, etc.) to store element identifiers and a permission indicator specifying whether the corresponding element identifier is to be restricted or permitted, and among others. In some implementations, the local restricted content database 240 may include a first list (e.g., whitelist) of element identifiers to be permitted and a second list (e.g., blacklist) of element identifiers to be restricted. The remote restricted content database 245 may be maintained by another computing device. In some implementations, the remote restricted content database 245 may be maintained by an instantiation of the presentation restrictor 165 different from a computing device executing the element hasher 220. In some implementations, the local restricted content database 240 may be stored and maintained as the proxy device 145 or the remote content restrictor device 150. The remote restricted content database 245 can include any data structure (e.g., array, heap, linked list, binary tree, matrix, table, etc.) to store element identifiers and a permission indicator specifying whether the corresponding element identifier is to be restricted or permitted. In some implementations, the remote restricted content database 245 may include a first list of element identifiers to be permitted and a second list of element identifiers to be restricted. In some implementations, the local instantiation of the presentation restrictor 165 may maintain the local restricted content database 245 (e.g., blacklist) to store element identified specified as to be restricted. In some implementations, the local instantiation of the presentation restrictor 165 can maintain a separate local non-restricted content database (e.g., whitelist) to store element identifiers specified as to be permitted. In some implementations, a remote instantiation of the presentation restrictor 165 may maintain the remote restricted content database 245 (e.g., blacklist) to store element identified specified as to be restricted. In some implementations, the remote instantiation of the presentation restrictor 165 can maintain a separate remote non-restricted content database (e.g., whitelist) to store element identifiers specified as to be permitted.

The content restrictor 225 can initially access the local restricted content database 240. The content restrictor 225 can perform a search for the element identifier in the local restricted content database 240. In some implementations, the content restrictor 225 can traverse the local restricted content database 240 to find the element identifier. In some implementations, the content restrictor 225 can use the element identifier as an index for the data structure stored in the local restricted content database 240.

If the content restrictor 225 finds the element identifier in the local restricted content database 240, the content restrictor 225 can identify the permission indicator for the element identifier. The content restrictor 225 can use the permission indicator to determine whether to apply the content restriction policy to the content element 210A-N corresponding to the element identifier.

On the other hand, if the content restrictor 225 does not find the element identifier in the local restricted content database 240, the content restrictor 225 can transmit a request to find the element identifier to the remote restricted content database 245. The request to find the element identifier may include the element identifier generated by the element hasher 220, among other data. The remote restricted content database 245 may be maintained or associated with a device remote from the local instantiation of the presentation restrictor 165. In some implementations, the content restrictor 225 executing on the client device 125 can transmit the request to the proxy device 145 or the remote content restrictor device 150 maintaining the remote restricted content database 245.

Responsive to receiving the request from the computing device, the remote device (e.g., the proxy device 145 or the remote content restrictor device 150) can access the remote restricted content database 245 using the element identifier in the request. The remote device can perform a search for the element identifier in the remote restricted content database 245. In some implementations, the remote device can traverse the remote restricted content database 245 to find the element identifier. In some implementations, the remote device can use the element identifier as an index for the data structure stored in the remote restricted content database 245.

If the remote device finds the element identifier in the remote restricted content database 245, the remote device can identify the permission indicator for the element identifier. Responsive to finding the element identifier, the remote device can also transmit a positive response to the content restrictor 225. The positive response may indicate that the element identifier is on the remote restricted content database 245. The positive response may also include the permission indicator as specified in the remote restricted content database 245. The content restrictor 225 can receive the positive response from the remote device associated with the remote restricted content database 245. The content restrictor 225 can store the element identifier and the permission indicator received from the remote device onto the local restricted content database 240. Based on the permission indicator, the content restrictor 225 can determine whether to apply the content restriction policy to the content element 210A-N to the corresponding permission indicator.

If the remote device does not find the element identifier in the remote restricted content database 245, the remote device can also transmit a negative response to the content restrictor 225. The negative response may indicate that the element identifier is not on the remote restricted content database 245. The content restrictor 225 can receive the negative response from the remote device associated with the remote restricted content database 245. In response to receiving the negative response from the remote device, the content restrictor 225 can invoke the rendering restrictor 230 to determine whether the content restriction policy is to be applied to the content element 210A-N in accordance with a rendering-based restriction extension.

In addition, if the remote device does not find the element identifier in the remote restricted content database 245, the remote device can determine whether the content element 210A-N is to be modified in accordance to a rendering-based restriction extension based on the rendering properties of the content element 210A-N and the information resource 205. The determination of whether the content element 210A-N is to be modified in accordance to the rendering-based restriction extension may be performed by an instantiation of the rendering restrictor 230 at the remote device. The remote device can access the rendering properties of the content element 210A-N and the information resource 205 received by the application 160. In some implementations, the remote device can transmit a request for the rendering properties to the device executing the application 160. The remote device can subsequently receive the rendering properties of the content element 210A-N of the information resource 205 from the device.

By analyzing the rendering properties of the content element 210A-N and the rendering properties of the information resource 205 in accordance with the rendering-based restriction extension, the remote device can determine whether the content restriction policy is to be applied to the content element 210A-N. The rendering-based restriction extension may specify that the content restriction policy is to be applied to content elements 210A-N with certain rendering properties. In general, analyzing the rendering properties of the content element 210A-N and the rendering properties of the information resource 205 in accordance to the rendering-based restriction extension may be computationally more complex than hashing functions. As such, the rendering-based restriction extension may consume more computer resources and processing time relative to hashing functions, leading to degradation and lag in performance of the remote device. To partially alleviate the consumption of computer resources and to reduce the processing time to some degree, the generation of the element identifier using the hashing function and the analysis of the rendering properties may be bifurcated or otherwise allocated across multiple devices and instantiations of the presentation restrictor 165.

In accordance with the rendering-based restriction extension, the remote device can compare the rendering properties of the content element 210A-N to designated rendering properties to determine whether the content restriction policy is to be applied to the content element 210A-N. In some implementations, the remote device can compare dimensions of the content element 210A-N on the information resource 205 to predesignated dimensions (e.g., 468×60 pixels (full banner), 160×600 pixels (wide skyscraper banner), and 720×300 pixels (pop-under)). If the remote device determines a match between the dimension of the content element 210A-N and the predesignated position, the remote device can determine that the content restriction policy is to be applied to the content element 210A-N. In some implementations, the remote device can compare a position of the content element 210A-N on the information resource 205 to a predesignated position (e.g., toward a top or along the sides of the information resource 205). If the remote device determines a match between the position of the content element 210A-N and the designated position, the remote device can determine that the content restriction policy is to be applied to the content element 210A-N. In some implementations, the remote device can identify a color value (e.g., RGB value, alphanumeric identifier, or HTML color code) of the content element 210A-N and a color value of the information resource 205. If the color value of the content element 210A-N and the color value of the information resource 205 are different by a predefined margin, the remote device can determine that the content restriction policy is to be applied to the content element 210A-N. If none of these match, the remote device can determine that the content restriction policy is not to be applied to the content element 210A-N.

The remote device can also apply any number and combination of image recognition algorithms to determine whether the content restriction policy is to be applied to the content element 210A-N based on the rendering properties in accordance with the rendering-based restriction extension. The content element 210A-N may include an image or may include a source address for the image. The content element 210A-N may include a video or may include a source address for the video. In some implementations, the remote device can apply image recognition algorithms to determine whether the image or the video of the content element 210A-N includes a restricted visual element (e.g., nudity, violence, drugs, and other undesired elements in the image or video). The image recognition algorithms may include optical character recognition, object recognition, edge detection, feature detection (e.g., affine feature detection), and pattern recognition algorithms, among others. In some implementations, the remote device can identify a character string from the image of the content element 210A-N using optical character recognition algorithms. The remote device can compare the identified character string to a predesignated character string (e.g., "click here," "purchase," "sale," "XXX," and "$", etc.). If the identified character string matches the predesignated character string, the remote device can determine that the content restriction policy is to be applied to the content element 210A-N. Otherwise, the remote device can determine that the content restriction policy is not to be applied to the content element 210A-N.

In conjunction with the determination of whether the content restriction policy is to be applied to the content element 210A-N based on the analysis of the rendering properties, the remote device can add or insert the element identifier corresponding to the content element 210A-N to the remote restricted content database 245. If the remote device determines that the content restriction policy is to be applied, the remote device can add or insert a permission indicator specifying that the content element 210A-N corresponding to the element identifier is to be restricted. If the remote device determines that the content restriction policy is not to be applied, the remote device can add or insert a permission indicator specifying that the content element 210A-N corresponding to the element identifier is to be permitted into the remote restricted content database 245. Subsequently, the remote device can transmit the positive response to the content restrictor 225. The positive response may indicate that the element identifier is on the remote restricted content database 245. The positive response may also include the permission indicator retrieved from the remote restricted content database 245.

In some implementations, if the content restrictor 225 does not find the element identifier in the local restricted content database 240, the content restrictor 225 can invoke the rendering restrictor 230. When invoked, the rendering restrictor 230 can analyze the content element 210A-N to determine whether the content restriction policy is to be applied to the content element 210A-N in accordance with the rendering-based restriction extension. The content restrictor 225 can also invoke the rendering restrictor 230 to analyze the content element 210A-N in response to receiving a negative response for the element identifier from the remote device associated with the remote restricted content database 245.

By analyzing the rendering properties of the content element 210A-N and the rendering properties of the information resource 205 in accordance with the rendering-based restriction extension, the rendering restrictor 230 can determine whether the content restriction policy is to be applied to the content element 210A-N. The rendering-based restriction extension may specify that the content restriction policy is to be applied to content elements 210A-N with certain rendering properties.

In accordance with the rendering-based restriction extension, the rendering restrictor 230 can compare the rendering properties of the content element 210A-N to designated rendering properties to determine whether the content restriction policy is to be applied to the content element 210A-N. In some implementations, the rendering restrictor 230 can compare dimensions of the content element 210A-N on the information resource 205 to predesignated dimensions (e.g., 468×60 pixels (full banner), 160×600 pixels (wide skyscraper banner), and 720×300 pixels (pop-under)). If the rendering restrictor 230 determines a match between the dimension of the content element 210A-N and the predesignated position, the rendering restrictor 230 can determine that the content restriction policy is to be applied to the content element 210A-N. In some implementations, the rendering restrictor 230 can compare a position of the content element 210A-N on the information resource 205 to a predesignated position (e.g., toward a top or along the sides of the information resource 205). If the rendering restrictor 230 determines a match between the position of the content element 210A-N and the designated position, the rendering restrictor 230 can determine that the content restriction policy is to be applied to the content element 210A-N. In some implementations, the rendering restrictor 230 can identify a color value (e.g., RGB value, alphanumeric identifier, or HTML color code) of the content element 210A-N and a color value of the information resource 205. If the color value of the content element 210A-N and the color value of the information resource 205 are different by a predefined margin, the rendering restrictor 230 can determine that the content restriction policy is to be applied to the content element 210A-N. If none of these match, the rendering restrictor 230 can determine that the content restriction policy is not to be applied to the content element 210A-N.

The rendering restrictor 230 can also apply any number and combination of image recognition algorithms to determine whether the content restriction policy is to be applied to the content element 210A-N based on the rendering properties in accordance with the rendering-based restriction extension. The content element 210A-N may include an image or may include a source address for the image. The content element 210A-N may include an image or may include a source address for the image. In some implementations, the rendering restrictor 230 can apply image recognition algorithms to determine whether the image or the video of the content element 210A-N includes a restricted visual element (e.g., nudity, violence, drugs, and other undesired elements in the image or video). The image recognition algorithms may include optical character recognition, object recognition, edge detection, feature detection (e.g., affine feature detection), and pattern recognition algorithms, among others. In some implementations, the rendering restrictor 230 can identify a character string from the image of the content element 210A-N using optical character recognition algorithms. The rendering restrictor 230 can compare the identified character string to a predesignated character string (e.g., "click here," "purchase," "sale," "XXX," and "$", etc.). If the identified character string matches the predesignated character string, the rendering restrictor 230 can determine that the content restriction policy is to be applied to the content element 210A-N.

Otherwise, the rendering restrictor 230 can determine that the content restriction policy is not to be applied to the content element 210A-N.

In conjunction with the determination of whether the content restriction policy is to be applied to the content element 210A-N based on the analysis of the rendering properties, the rendering restrictor 230 can add or insert the element identifier corresponding to the content element 210A-N to the local restricted content database 240. If the rendering restrictor 230 determines that the content restriction policy is to be applied, the rendering restrictor 230 can add or insert a permission indicator specifying that the content element 210A-N corresponding to the element identifier is to be restricted. If the rendering restrictor 230 determines that the content restriction policy is not to be applied, the rendering restrictor 230 can add or insert a permission indicator specifying that the content element 210A-N corresponding to the element identifier is to be permitted. The rendering restrictor 230 or the content restrictor 225 can transmit the element identifier and the permission indicator to other computing devices connected to the network (e.g., other client devices 125, the proxy device 145, and the remote content restrictor device 150). In some implementations, rendering restrictor 230 or the content restrictor 225 can transmit the element identifier and the permission indicator to a second client device 125 via the network 105 for storage at a local restricted content database maintained by the second client device 125. In some implementations, the rendering restrictor 230 or the content restrictor 225 can transmit the element identifier and the permission indicator to the proxy device 145 for storage at a restricted content database maintained by the proxy device 145. In some implementations, the rendering restrictor 230 or the content restrictor 225 can transmit the element identifier and the permission indicator to the remote content restrictor device 150 for storage at the remote restricted content database 250. By sharing the element identifier across computing devices connected to the network 105, the computing device executing the presentation restrictor 165 may avoid repeatedly applying computationally complex image processing techniques on the same content element 210A-N. Thus, sharing the element identifier may increase efficiency for computing devices executing the presentation restrictor 165, freeing up processing resources for other functions.

If the element identifier is not found in either the local restricted content database 240 or the remote restricted content database 245, the content restrictor 225 can maintain the content element 210A-N during a first inclusion of the content element 210A-N on the information resource 205 by the application 160. The first inclusion of the content element 210A-N may correspond to the first provision of the content element 210A-N to any device executing the presentation restrictor 165 connected to the network 105. In some implementations, the content restrictor 225 can set or maintain the properties of the content element 210A-N to default values during the first inclusion of the information resource 205. Subsequent to the first inclusion of the content element 210A-N on the information resource 205, the content restrictor 225 can invoke the rendering restrictor 230. When invoked, the rendering restrictor 230 can analyze the content element 210A-N to determine whether the content restriction policy is to be applied to the content element 210A-N in accordance with the rendering-based restriction extension using the functionalities described herein. If the rendering restrictor 230 determines that the content restriction policy is to be applied to content element 210A-N based on the rendering properties, the content restrictor 225 can modify the content element 210A-N during subsequent inclusions of the content element 210A-N on any information resource. In this manner, the content element 210A-N may be presented and rendered on the information resource 205 at the content restrictor 225 executing the application 160 during the first provision. Based on the analysis of the rendering properties of the content element 210A-N and the information resource 205, the content element 210A-N may be modified in subsequent modifications and provisions of the content element 210A-N to the content restrictor 225s executing the application 160.

Responsive to finding the element identifier in the local restricted content database 240 or the remote restricted content database 245, the content restrictor 225 can modify the presentation of the content element 210A-N on the information resource 205 in accordance with the content restriction policy. The content restriction policy maintained at the content restriction policy database 235 may specify the content restrictor 225 to perform any number or combinations of actions to modify the presentation of the content element 210A-N. In some implementations, the content restrictor 225 can disable the content element 210A-N as specified by the content restriction policy. In some implementations, the content restrictor 225 can delete or remove the content element 210A-N from the information resource 205 as specified by the content restriction policy. In some implementations, the content restrictor 225 can identify a code segment corresponding to the content element 210A-N in the markup for the information resource 205. The content restrictor 225 can delete, remove, or otherwise cause to be ineffective the code segment corresponding to the content element 210A-N. In some implementations, the content restrictor 225 can set a visibility property of the content element 210A-N from on to off as specified by the content restriction policy. Setting the visibility property of the content element 210A-N from on to off may cause the application 160 to not render, display, or otherwise present the content element 210A-N on the information resource 205. In some implementations, the content restrictor 225 can remove any redirection links from the content element 210A-N as specified by the content restriction policy. Interaction or activation of the redirection link may cause the content restrictor 225 executing the application 160 to retrieve additional content. In some implementations, the content restrictor 225 can determine whether the content element 210A-N includes a redirection link based on the code segment corresponding to the content element 210A-N.

The content restrictor 225 can also modify transmissions and receipt of data associated with the content element 210A-N on the information resource 205 as specified by the content restriction policy in response to identifying the element identifier on the local restricted content database 240 or the remote restricted content database 245. In some implementations, the content restrictor 225 can alter transmissions of data packets from the computing device executing the application 160 associated with the content element 210A-N. The content element 210A-N may include a code segment specifying the computing device executing the application 160 to transmit an acknowledgement response to a log server. The acknowledgement response may represent a confirmation of receipt or presentation of the content element 210A-N at the computing device executing the application 160. The content restrictor 225 can identify the code segment for transmission of the acknowledgement response. In some implementations, the content restrictor 225 can modify, remove, or delete the identified code segment to disable the transmission of the acknowledgement response. In some implementations, content restrictor 225 can also permit the transmission of the acknowledgement response and can subsequently modify, remove, or delete the identified code segment to disable the transmission of the acknowledgement response. In some implementations, the content restrictor 225 can alter receipt of data packets from another computing device (e.g., the data processing system 110, the content provider device 115, and the content publisher device 120) associated with the content element 210A-N. In some implementations, the content restrictor 225 can receive the data packets (e.g., fragment chunks for streaming video). The content restrictor 225 can then remove the data packets from processing by the application 160.

If the element identifier is identified in the local restricted content database 240 by the content restrictor 225 or the remote restricted content database 245 by the remote device, the content restrictor 225 can add an additional content element 210A-N on the information resource 205 to modify the presentation of the content element 210A-N. The content restrictor 225 can identify a position and dimensions of the content element 210A-N. The content restrictor 225 can identify the visual characteristics (e.g., color value) of the information resource 205 including the content element 210A-N. The content restrictor 225 can then generate the additional content element with the identified position and dimensions of the content element 210A-N and the visual characteristics of the information resource 205 to occlude the content element 210A-N.

Figure 3:
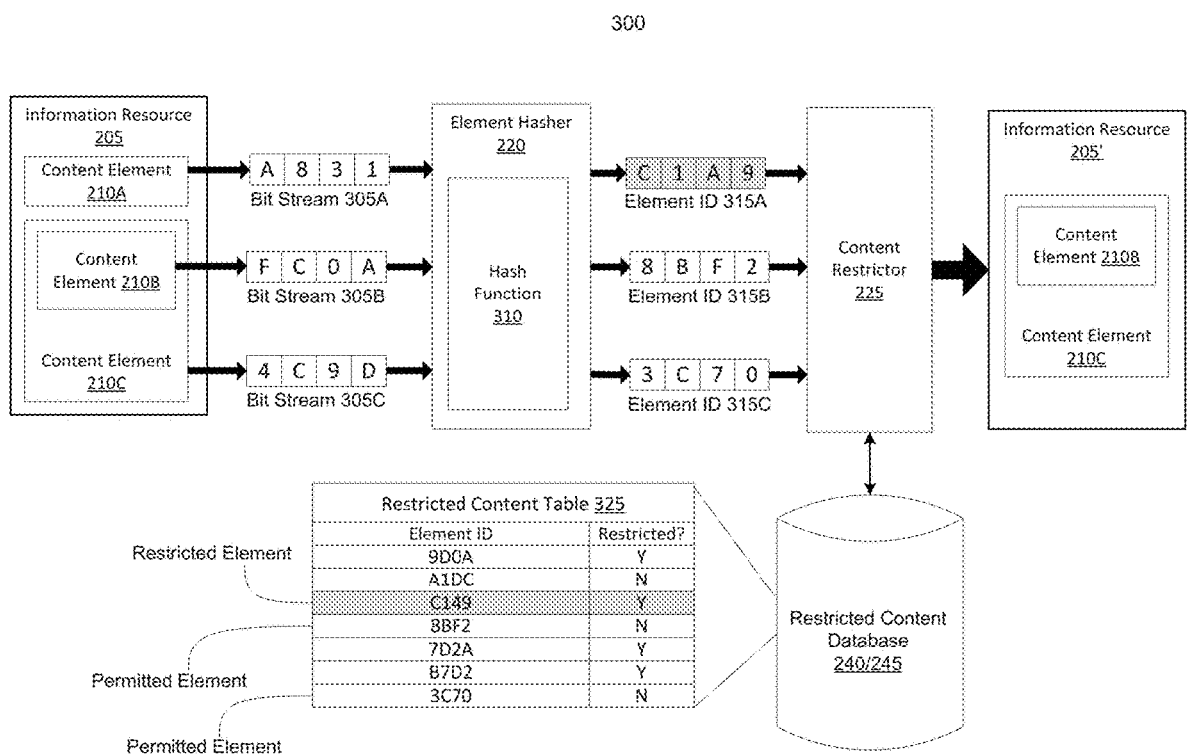
FIG. 3 is a block diagram depicting a flow process of content elements of an information resource permitted or restricted by the system for restricting content, according to an illustrative implementation.

Now referring to FIG. 3, FIG. 3 is a block diagram depicting a flow process 300 of content elements 210A-N of an information resource 205 permitted or restricted by the system 200 for restricting content, according to an illustrative implementation. As depicted in the flow process 300 for FIG. 3, the information resource 205 may include a first content element 210A, a second content element 210B, and a third content element 210C. The information resource 205 and each of the content elements 210A-C may correspond to a binary sequence or bit stream (depicted in hexadecimal form). The first content element 210A may correspond to a first bit stream 305A (e.g., "xA831"). The second content element 210B may correspond to a second bit stream 305B (e.g., "xFC0A"). The third content element 210C may correspond to a third bit stream 305C (e.g., "x4C9D").

In the context of FIG. 2, the element hasher 220 can use a hashing function 310 to generate element identifiers 315A-C (depicted also in hexadecimal form) corresponding to one of the content elements 210A-C using the bit streams 305A-N. The bit streams 305A-N may have been identified and obtained by the resource parser 215. As depicted in the flow process 300 in FIG. 3, the element hasher 220 can generate the element identifier 315A ("xC1A9") for the first content element 210A for the first bit stream 305A. The element hasher 220 can generate the second element identifier 315B ("x8BF2") for the second content element 210B for the second bit stream 305B. The element hasher 220 can generate the third element identifier 315C ("x3C70") for the third content element 210C for the third bit stream 305C.

Still referring to FIG. 3 in the context of FIG. 2, the content restrictor 225 can use the element identifiers 315A-C to determine whether the content restriction policy is to be applied to any of the content elements 210A-C. To that end, the content restrictor 225 can search a restricted content database, such as the local restricted content database 240 or the remote restricted content database 245, for the element identifiers 315A-C. The restricted content database may include a data structure, such as a restricted content table 315, for arranging the element identifiers by permission indicator. On the restricted content table 325 stored at the restricted content database, the content restrictor 225 can identify the first element identifier 315A, the second element identifier 315B, and the third element identifier 315C. For the first element identifier 315A, the content restrictor 225 can verify that the permission indicator specifies that the corresponding first content element 205A is to be restricted. In contrast, for the second element identifier 315B and the third element identifier 315C, the permission indicator specifies that both the second content element 205B and the third content element 205C are to be permitted.

Having found the first element identifier 315A corresponding to the first content element 205A in the restricted content database, the content restrictor 225 can apply the content restriction policy to the first content element 205A. As depicted in FIG. 3, the content restrictor 225 can delete the first content element 210A from the information resource 205. The content restrictor 225 can also simultaneously maintain the second content element 210B and the third content element 210C.

Figure 4:
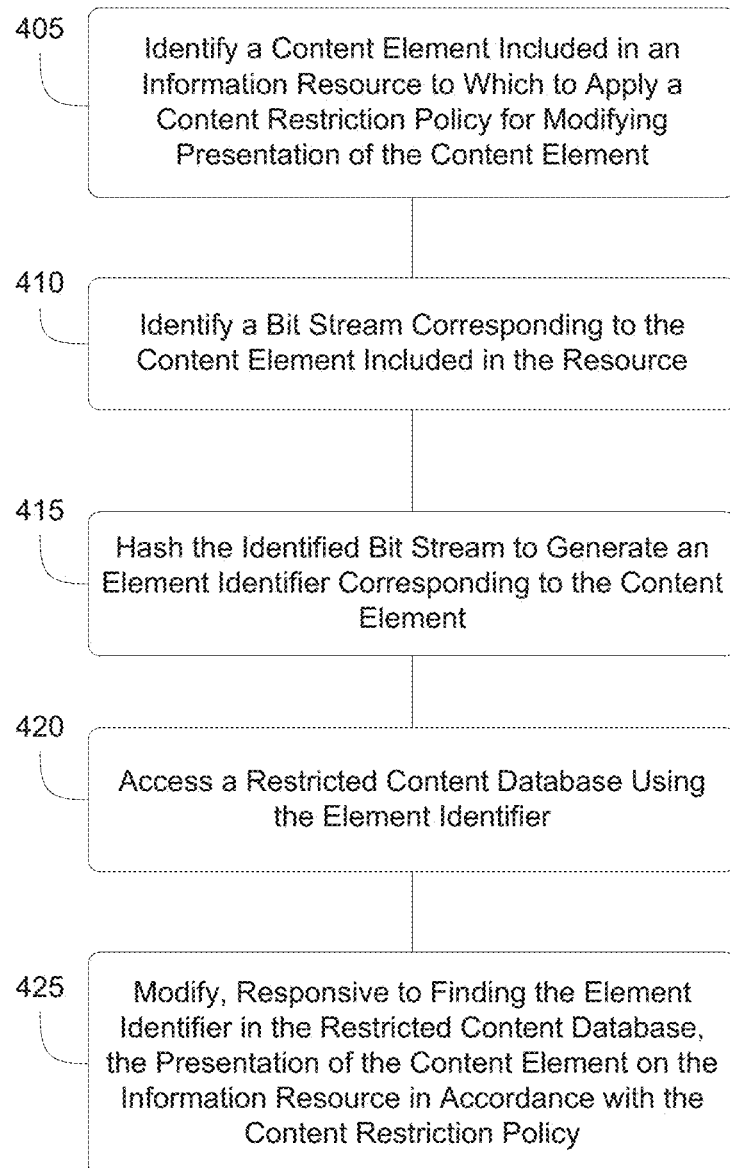
FIG. 4 is a flow diagram depicting a method of restricting content inserted into information resources, according to an illustrative implementation.
Figure 10:
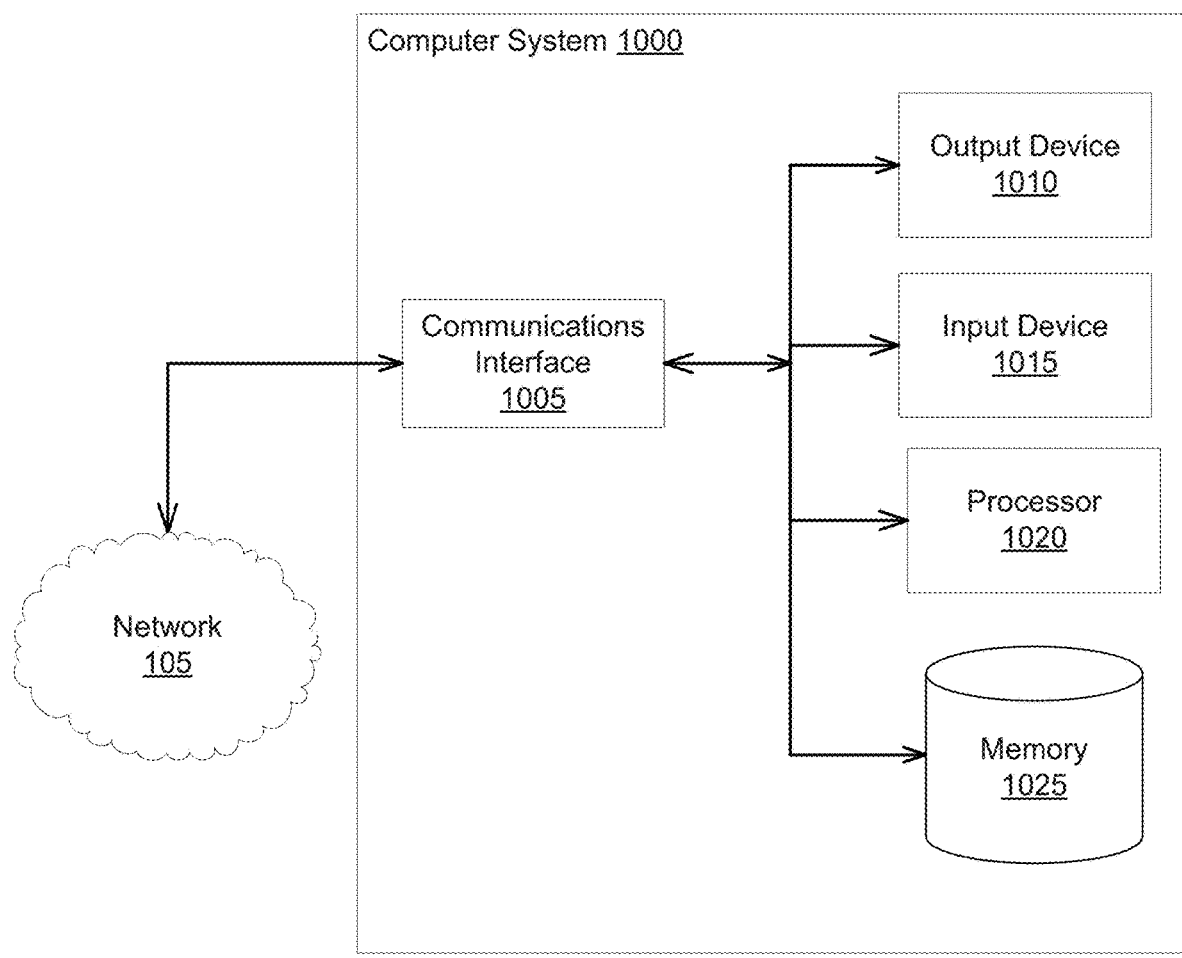
FIG. 10 is a block diagram illustrating a general architecture for a computer system that may be employed to implement elements of the systems and methods described and illustrated herein, according to an illustrative implementation.

Now referring to FIG. 4, FIG. 4 is a flow diagram depicting a method 400 of restricting content inserted into information resources, in accordance to an illustrative implementation. The functionality described herein with respect to method 400 can be performed or otherwise executed by the client device 125, the proxy device 145, or the remote content restrictor device 150 as shown in FIG. 1, the system 200 as shown in FIG. 2, or a computing device as shown in FIG. 10, or any combination thereof. In brief overview, a computing device having one or more processors can identify a content element included in an information resource to which to apply a content restriction policy for modifying presentation of the content element (BLOCK 405). The computing device can identify a bit stream corresponding to the content element included in the information resource (BLOCK 410). The computing device can hash the identified bit stream to generate an element identifier corresponding to the content element (BLOCK 415). The computing device can access a restricted content database using the element identifier (BLOCK 420). The computing device can modify the presentation of the content element on the information resource in accordance with the content restriction policy, responsive to finding the element identifier in the restricted content database (BLOCK 425).

In further detail, the computing device having one or more processors can identify a content element included in an information resource to which to apply a content restriction policy for modifying presentation of the content element (BLOCK 405). The computing device can identify a content element included in the information resource to which to apply a content restriction policy for modifying presentation of the content element. The content restriction policy may be stored at the content restriction policy database and be maintained by the presentation restrictor. The content restriction policy may specify which element types of content elements are to be further analyzed and how to modify content elements identified as restricted. The computing device can interface with the application to access the information resource and the content elements included in the information resource.

In accordance with the content restriction policy, the resource parser can identify a subset of content elements included in the information resource for further analysis. The computing device can identify an element type for each content element included in the information resource. The element type may include one of body, paragraph, division, section, inline frame, image, canvas, applet, script, audio, video, table, and list, among others. The element type may correspond to an HTML tag (e.g., "<iframe>" for inline frames). In some implementations, the content restriction policy may specify an element type to be further analyzed (e.g., inline frames, images, applets, etc.). The computing device can identify the subset of content elements matching the element type to be further analyzed as specified in the content restriction policy. In this manner, the presentation restrictor may reduce the number of content elements to be processed, thereby freeing up computing resources.

The computing device can identify a bit stream corresponding to the content element included in the information resource (BLOCK 410). To determine whether the content restriction policy is to be applied to the content element, the computing device can identify a bit stream corresponding to the content element included in the information resource. The information resource may correspond to a binary sequence (e.g., a byte array or byte stream). Each content element included in the information resource may correspond to a portion of the binary sequence. In some implementations, the computing device can interface with the application to access the binary sequence corresponding to the information resource. In some implementations, the computing device can interface with the application to access the portion of the binary sequence corresponding to one of the content elements. In some implementations, the computing device can interface with the application to access the portion of the binary sequence corresponding to the subset of content elements identified as matching the element type to be further analyzed as specified by the content restriction policy. In some implementations, the computing device can identify a subset portion of the bit stream of the content element (e.g., the first N number of bits in the bit stream or every fifth bit in the bit stream, etc.).

The computing device can hash the identified bit stream to generate an element identifier corresponding to the content element (BLOCK 415). With the computing device having identified the bit stream, the computing device can hash the identified bit stream to generate an element identifier corresponding to the content element. In some implementations, the computing device may use a hashing function on the identified bit stream to generate the element identifier corresponding to the content element. The hashing function may include any combination of the bit stream identified for the content element, such as cryptographic hashing functions (e.g., Secure Hash Algorithms (SHA-1, SHA-2, and SHA-3), Message-Digest Algorithms (MD2, MD4, MD5, and MD6), checksum functions, etc.), cyclic redundancy check algorithms, hash tables (e.g., an associative array), and geometric hashing functions, or any one-to-one hashing function, among others. The hashing function may be configured or selected to minimize hash collisions, such that the likelihood that the same element identifying two different content elements is decreased. In some implementations, the computing device can hash subset portion of the bit stream of the content element.

In some implementations, the hashing function used by the computing device may be common across all instantiations of the presentation restrictor. For the same content element, one instantiation of the computing device at one computing device can generate the same element identifier as another instantiation of the computing device at another computing device. In this manner, the computing device can generate a single element identifier to identify the same content element transmitted over the network to computing devices connected thereto.

In some implementations, the hashing function used by the computing device may be unique to a local instantiation of the presentation restrictor. For the same content element, one instantiation of the computing device at one computing device can generate an element identifier different from an element identifier generated by another instantiation of the computing device executed at another computing device. The computing device can generate an element identifier unique to the local instantiation of the presentation restrictor. By using a hashing function unique to the local instantiation of the presentation restrictor, the computing device can enhance data security and encryption, as well as user privacy.

In some implementations, the hashing function used by the computing device can account for any encryption algorithm of the binary sequence corresponding to the information resource or the content element. Any intermediary device can apply an encryption algorithm to the binary sequence corresponding to the information resource or the content element, thereby altering the binary sequence. In some implementations, the encryption algorithm applied to the binary sequence may include Wired Equivalent Privacy (WEP) and Wi-Fi Protected Access (WPA), among other cryptographic protocols. Due to the encryption algorithm, the computing device executing at one computing device can generate an element identifier different from an element identifier generated by computing device executing at another computing device. To bypass or nullify the effects of the encryption algorithm applied to the binary sequence, the computing device can use a one-to-one hashing function to generate an element identifier for each identified bit stream. In this manner, although the element identifier generated by the computing device may be unique to the local instantiation of the presentation restrictor, the encryption algorithm applied by the intermediary device may result in a unique value. As such, the element identifier generated by the computing device at one instantiation of the presentation restrictor may be used across other instantiations of the presentation restrictor at other devices.

The computing device can access a restricted content database using the element identifier (BLOCK 420). Using the element identifier generated by the computing device, the computing device can access the local restricted content database or the remote restricted content database to determine whether to apply the content restriction policy to the content element. The local restricted content database may be maintained by an instantiation of the presentation restrictor local to the computing device executing the computing device. The local restricted content database can include any data structure (e.g., array, heap, linked list, binary tree, matrix, table, etc.) to store element identifiers and a permission indicator specifying whether the corresponding element identifier is to be restricted or permitted, and among others. The remote restricted content database may be maintained by another computing device. In some implementations, the remote restricted content database may be maintained by an instantiation of the presentation restrictor different from the computing device executing the computing device. In some implementations, the local restricted content database may be stored and maintained as a remote device. The remote restricted content database can include any data structure (e.g., array, heap, linked list, binary tree, matrix, table, etc.) to store element identifiers and a permission indicator specifying whether the corresponding element identifier is to be restricted or permitted, among others.

The computing device can initially access the local restricted content database. The computing device can perform a search for the element identifier in the local restricted content database. In some implementations, the computing device can traverse the local restricted content database to find the element identifier. In some implementations, the computing device can use the element identifier as an index for the data structure stored in the local restricted content database. If the computing device finds the element identifier in the local restricted content database, the computing device can identify the permission indicator for the element identifier. The computing device can use the permission indicator to determine whether to apply the content restriction policy to the content element corresponding to the element identifier.

On the other hand, if the computing device does not find the element identifier in the local restricted content database, the computing device can transmit a request to find the element identifier to the remote restricted content database. The request to find the element identifier may include the element identifier generated by the computing device, among other data. The remote restricted content database may be maintained or associated with a device remote from the local instantiation of the presentation restrictor. In some implementations, the computing device can transmit the request to the remote device maintaining the remote restricted content database.

Responsive to receiving the request from the computing device, the remote device can access the remote restricted content database using the element identifier in the request. The remote device can perform a search for the element identifier in the remote restricted content database. In some implementations, the remote device can traverse the remote restricted content database to find the element identifier. In some implementations, the remote device can use the element identifier as an index for the data structure stored in the remote restricted content database.

If the remote device finds the element identifier in the remote restricted content database, the remote device can identify the permission indicator for the element identifier. Responsive to finding the element identifier, the remote device can also transmit a positive response to the computing device. The positive response may indicate that the element identifier is on the remote restricted content database. The positive response may also include the permission indicator as specified in the remote restricted content database. The computing device can receive the positive response from the remote device associated with the remote restricted content database. The computing device can store the element identifier and the permission indicator received from the remote device onto the local restricted content database. Based on the permission indicator, the computing device can determine whether to apply the content restriction policy to the content element to the corresponding permission indicator.

If the remote device does not find the element identifier in the remote restricted content database, the remote device can also transmit a negative response to the computing device. The negative response may indicate that the element identifier is not on the remote restricted content database. The computing device can receive the negative response from the remote device associated with the remote restricted content database. In response to receiving the negative response from the remote device, the computing device can invoke the computing device to determine whether the content restriction policy is to be applied to the content element in accordance with a rendering-based restriction extension.

In addition, if the remote device does not find the element identifier in the remote restricted content database, the remote device can determine whether the content element is to be modified in accordance to a rendering-based restriction extension based on rendering properties of the content element and the information resource. The determination of whether the content element is to be modified in accordance to the rendering-based restriction extension may be performed by an instantiation of the computing device at the remote device. The remote device can access the rendering properties of the content element and the information resource received by the application. In some implementations, the remote device can transmit a request for the rendering properties to the device executing the application. The remote device can subsequently receive the rendering properties of the content element of the information resource from the device.

By analyzing the rendering properties of the content element and the rendering properties of the information resource in accordance with the rendering-based restriction extension, the remote device can determine whether the content restriction policy is to be applied to the content element. The rendering-based restriction extension may specify that the content restriction policy is to be applied to content elements with certain rendering properties. In general, analyzing the rendering properties of the content element and the rendering properties of the information resource in accordance to the rendering-based restriction extension may be computationally more complex than hashing functions. As such, the rendering-based restriction extension may consume more computer resources and processing time relative to hashing functions, leading to degradation and lag in performance of the remote device. To partially alleviate the consumption of computer resources and to reduce the processing time to some degree, the generation of the element identifier using the hashing function and the analysis of the rendering properties may be bifurcated or otherwise allocated across multiple devices and instantiations of the presentation restrictor.

In accordance with the rendering-based restriction extension, the remote device can compare the rendering properties of the content element to designated rendering properties to determine whether the content restriction policy is to be applied to the content element. In some implementations, the remote device can compare dimensions of the content element on the information resource to predesignated dimensions. If the remote device determines a match between the dimension of the content element and the predesignated position, the remote device can determine that the content restriction policy is to be applied to the content element. In some implementations, the remote device can compare a position of the content element on the information resource to a predesignated position (e.g., toward a top or along the sides of the information resource). If the remote device determines a match between the position of the content element and the designated position, the remote device can determine that the content restriction policy is to be applied to the content element. In some implementations, the remote device can identify a color value (e.g., RGB value, alphanumeric identifier, or HTML color code) of the content element and a color value of the information resource. If the color value of the content element and the color value of the information resource are different by a predefined margin, the remote device can determine that the content restriction policy is to be applied to the content element. If none of these match, the remote device can determine that the content restriction policy is not to be applied to the content element.

The remote device can also apply any number and combination of image recognition algorithms to determine whether the content restriction policy is to be applied to the content element based on the rendering properties in accordance with the rendering-based restriction extension. The content element may include an image or may include a source address for the image. The content element may include a video or may include a source address for the video. In some implementations, the remote device can apply image recognition algorithms to determine whether the image or the video of the content element includes a restricted visual element. The image recognition algorithms may include optical character recognition, object recognition, edge detection, feature detection (e.g., affine feature detection), and pattern recognition algorithms, among others. In some implementations, the remote device can identify a character string from the image of the content element using optical character recognition algorithms. The remote device can compare the identified character string to a predesignated character string. If the identifier character string matches the predesignated character string, the remote device can determine that the content restriction policy is to be applied to the content element. Otherwise, the remote device can determine that the content restriction policy is not to be applied to the content element.

In conjunction with the determination of whether the content restriction policy is to be applied to the content element based on the analysis of the rendering properties, the remote device can add or insert the element identifier corresponding to the content element to the remote restricted content database. If the remote device determines that the content restriction policy is to be applied, the remote device can add or insert a permission indicator specifying that the content element corresponding to the element identifier is to be restricted. If the remote device determines that the content restriction policy is not to be applied, the remote device can add or insert a permission indicator specifying that the content element corresponding to the element identifier is to be permitted. Subsequently, the remote device can transmit a positive response to the computing device. The positive response may indicate that the element identifier is on the remote restricted content database. The positive response may also include the permission indicator retrieved from the remote restricted content database.

In some implementations, if the computing device does not find the element identifier in the local restricted content database, the computing device can invoke the computing device. When invoked, the computing device can analyze the content element to determine whether the content restriction policy is to be applied to the content element in accordance with the rendering-based restriction extension. The computing device can also invoke the computing device to analyze the content element in response to receiving a negative response for the element identifier from the remote device associated with the remote restricted content database.

By analyzing the rendering properties of the content element and the rendering properties of the information resource in accordance with the rendering-based restriction extension, the computing device can determine whether the content restriction policy is to be applied to the content element. The rendering-based restriction extension may specify that the content restriction policy is to be applied to content elements with certain rendering properties.

In accordance with the rendering-based restriction extension, the computing device can compare the rendering properties of the content element to designated rendering properties to determine whether the content restriction policy is to be applied to the content element. In some implementations, the computing device can compare dimensions of the content element on the information resource to predesignated dimensions. If the computing device determines a match between the dimension of the content element and the predesignated position, the computing device can determine that the content restriction policy is to be applied to the content element. In some implementations, the computing device can compare a position of the content element on the information resource to a predesignated position (e.g., toward the top or along the sides of the information resource). If the computing device determines a match between the position of the content element and the designated position, the computing device can determine that the content restriction policy is to be applied to the content element. In some implementations, the computing device can identify a color value (e.g., RGB value, alphanumeric identifier, or HTML color code) of the content element and a color value of the information resource. If the color value of the content element and the color value of the information resource are different by a predefined margin, the computing device can determine that the content restriction policy is to be applied to the content element. If none of these match, the computing device can determine that the content restriction policy is not to be applied to the content element.

The computing device can also apply any number and combination of image recognition algorithms to determine whether the content restriction policy is to be applied to the content element based on the rendering properties in accordance with the rendering-based restriction extension. The content element may include an image or may include a source address for the image. The content element may include a video or may include a source address for the video. In some implementations, the computing device can apply image recognition algorithms to determine whether the image or the video of the content element includes a restricted visual element. The image recognition algorithms may include optical character recognition, object recognition, edge detection, feature detection (e.g., affine feature detection), and pattern recognition algorithms, among others. In some implementations, the computing device can identify a character string from the image of the content element using optical character recognition algorithms. The computing device can compare the identified character string to a predesignated character string. If the identifier character string matches the predesignated character string, the computing device can determine that the content restriction policy is to be applied to the content element. Otherwise, the computing device can determine that the content restriction policy is not to be applied to the content element.

In conjunction with the determination of whether the content restriction policy is to be applied to the content element based on the analysis of the rendering properties, the computing device can add or insert the element identifier corresponding to the content element to the local restricted content database. If the computing device determines that the content restriction policy is to be applied, the computing device can add or insert a permission indicator specifying that the content element corresponding to the element identifier is to be restricted. If the computing device determines that the content restriction policy is not to be applied, the computing device can add or insert a permission indicator specifying that the content element corresponding to the element identifier is to be permitted.

If the element identifier is not found in either the local restricted content database or the remote restricted content database, the computing device can maintain the content element during a first inclusion of the content element on the information resource by the application. The first inclusion of the content element may correspond to the first provision of the content element to any device executing the presentation restrictor connected to the network. In some implementations, the computing device can set or maintain the properties of the content element to default values during the first inclusion of the information resource. Subsequent to the first inclusion of the content element on the information resource, the computing device can invoke the computing device. When invoked, the computing device analyze the content element to determine whether the content restriction policy is to be applied to the content element in accordance with the rendering-based restriction extension using the functionalities described herein. If the computing device determines that the content restriction policy is to be applied to the content element based on the rendering properties, the computing device can modify the content element during subsequent inclusions of the content element on any information resource. In this manner, the content element may be presented and rendered on the information resource at the computing device executing the application during the first provision. Based on the analysis of the rendering properties of the content element and the information resource, the content element may be modified in subsequent modifications and provisions of the content element to the computing devices executing the application.

The computing device can modify the presentation of the content element on the information resource in accordance with the content restriction policy, responsive to finding the element identifier in the restricted content database (BLOCK 425). Responsive to finding the element identifier in the local restricted content database or the remote restricted content database, the computing device can modify the presentation of the content element on the information resource in accordance with the content restriction policy. The content restriction policy maintained at the content restriction policy database may specify the computing device to perform any number or combinations of actions to modify the presentation of the content element. In some implementations, the computing device can disable the content element as specified by the content restriction policy. In some implementations, the computing device can delete or remove the content element from the information resource, as specified by the content restriction policy. In some implementations, the computing device can identify a code segment corresponding to the content element in the markup for the information resource. The computing device can delete, remove, or otherwise cause to be ineffective the code segment corresponding to the content element. In some implementations, the computing device can set a visibility property of the content element from on to off as specified by the content restriction policy. Setting the visibility property of the content element from one to off may cause the application to not render, display, or otherwise present the content element on the information resource. In some implementations, the computing device can remove any redirection links from the content element as specified by the content restriction policy. Interaction or activation of the redirection link may cause the computing device executing the application to retrieve additional content. In some implementations, the computing device can determine whether the content element includes a redirection link based on the code segment corresponding to the content element.

The computing device can also modify transmissions and receipt of data associated with the content element on the information resource as specified by the content restriction policy, in response to finding the element identifier. In some implementations, the computing device can alter transmissions of data packets from the computing device executing the application associated with the content element. The content element may include a code segment specifying the computing device executing the application to transmit an acknowledgement response to a log server. The acknowledgement response may represent a confirmation of receipt or presentation of the content element at the computing device executing the application. The computing device can identify the code segment for transmission of the acknowledgement response. In some implementations, the computing device can modify, remove, or delete the identified code segment to disable the transmission of the acknowledgement response. In some implementations, computing device can also permit the transmission of the acknowledgement response and can subsequently modify, remove, or delete the identified code segment to disable the transmission of the acknowledgement response. In some implementations, the computing device can alter receipt of data packets from another computing device (e.g., the data processing system, the content provider device, and the content publisher device) associated with the content element. In some implementations, the computing device can receive the data packets (e.g., fragment chunks for streaming video). The computing device can then remove the data packets from being processed by the application.

If the element identifier is found in the local restricted content database or the remote restricted content database, the computing device can add an additional content element on the information resource to modify the presentation of the content element. The computing device can identify a position and dimensions of the content element. The computing device can identify the visual characteristics (e.g., color value) of the information resource including the content element. The computing device can then generate the additional content element with the identified position and dimensions of the content element and the visual characteristics of the information resource to occlude the content element.

Figure 5:
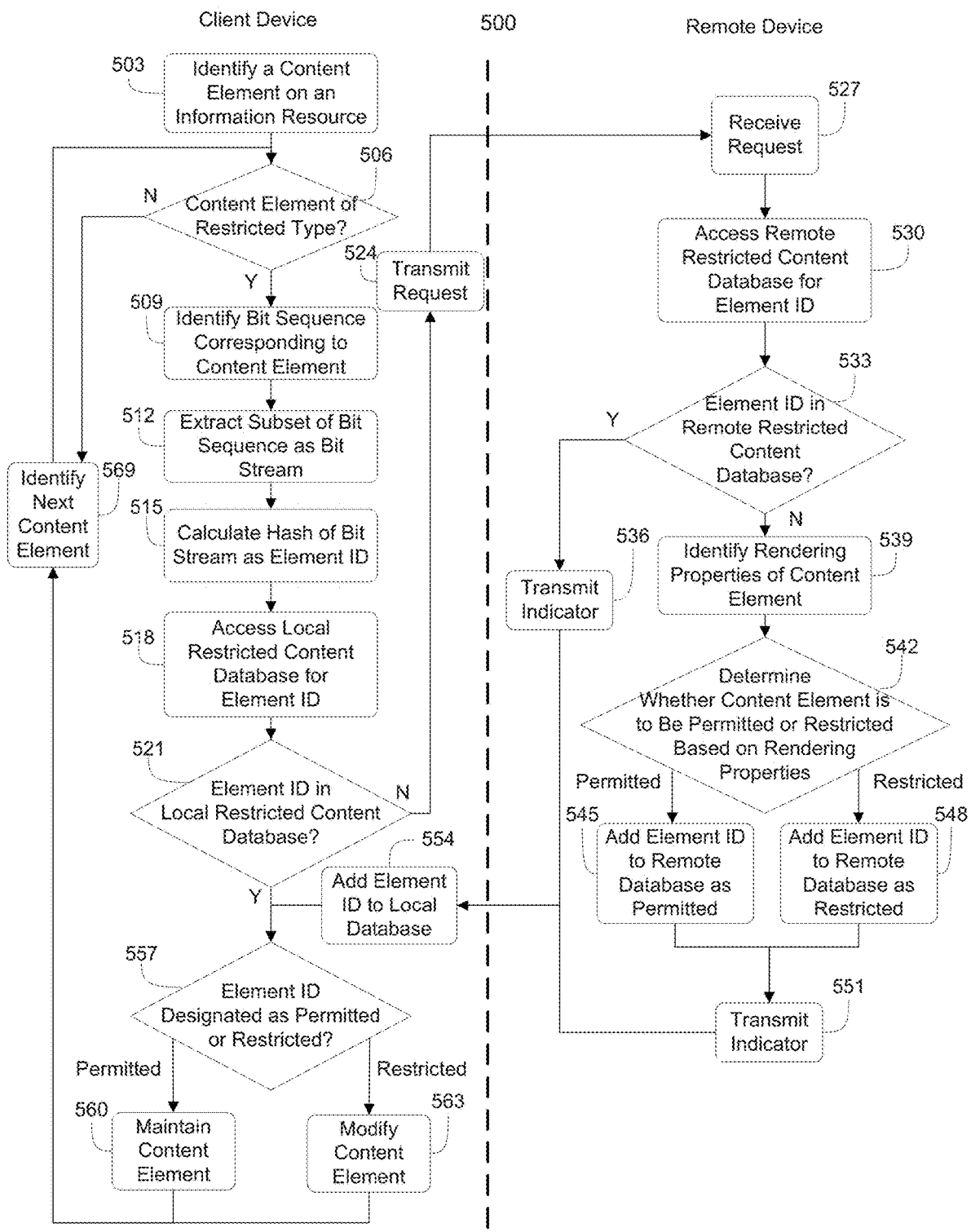
FIG. 5 is a flow diagram depicting a method of restricting content inserted into information resources, according to an illustrative implementation.

FIG. 5 is a flow diagram depicting a method 500 of restricting content inserted into information resources, according to an illustrative implementation. The functionality described herein with respect to method 500 can be performed or otherwise executed by the client device 125, proxy device 145, or the remote content restrictor device 150 as shown in FIG. 1, the system 200 as shown in FIG. 2, or a computing device as shown in FIG. 10, or any combination thereof. In overview, a client device can identify a content element on an information resource (BLOCK 503). The client device can determine whether the content element is of a restricted type (BLOCK 506). If the content element is not of the restricted type, the client device can identify a next content element on the information resource (BLOCK 569). If the content element is of the restricted type, the client device can identify a bit sequence corresponding to the content element (BLOCK 509). The client device can extract a subset of the bit sequence to obtain a bit stream for the content element (BLOCK 512). The client device can calculate a hash of the bit stream to generate the element identifier (BLOCK 515). The client device can access a local restricted content database to search the element identifier (BLOCK 518). The client device can determine whether the element identifier is in the local restricted content database (BLOCK 521). If the element identifier is not in the local restricted content database, the client device can transmit a request to a remote device (BLOCK 524).

The remote device can receive the request from the client device (BLOCK 527). The remote device can access a remote restricted content database to search for the element identifier (BLOCK 530). The remote device can determine whether the element identifier is in the remote restricted content database (BLOCK 533). If the element identifier is in the remote restricted content database, the remote device can transmit an indicator to the client device (BLOCK 536). If the element identifier is not in the remote restricted content database, the remote device can identify rendering properties of the content element (BLOCK 539). The remote device can determine whether the content element is to be modified based on the identified rendering properties (BLOCK 542). If permitted, the remote device can add the element identifier into the remote restricted content database as permitted (BLOCK 545). If restricted, the remote device can add the element identifier into the remote restricted content database as restricted (BLOCK 548). The remote device can transmit the indicator (BLOCK 551).

The client device can receive the indicator and add the element identifier into the local restricted content database (BLOCK 554). The client device can determine whether the element identifier is designated as permitted or restricted (BLOCK 557). If permitted, the client device can maintain the content element on the information resource (BLOCK 560). If restricted, the client device can modify the content element on the information resource (BLOCK 563). The client device can then identify the next content element on the information resource (BLOCK 569). The functionalities of method 500 may be repeated any number of times.

C. Systems and Methods of Restricting Content Inserted into Information Resources Content control modules operating as a plug-in on an application or as an individual program separate from the application executing on the client device or a proxy device (e.g., router) can interfere with the insertion or presentation of content elements onto an information resource. These content control modules can employ various combinations of techniques to interfere with the content elements on the information resource. One technique may be to identify that the content element is from a source different from the remainder of the information resource using source addresses. This technique may be counteracted if the source address for the content element is the same as that of the information resource. Another technique may be to identify content elements using image processing techniques to detect differences between the content elements and the underlying information resource. Such techniques, however, may be computationally expensive, resulting in lag and degradation of computer performance. Yet another technique may be to identify content elements by matching the hash value of the bit stream corresponding to the content element with those stored in a content restriction database maintaining a list of restricted hash values.

These content control modules may raise security issues. Such content control modules can change the constituent content elements initially served with the information resource without authorization. Furthermore, these modules can cause the behavior of the content elements and the information resources to deviate from how the information resource was originally programmed. For example, a content control module can change a link (e.g., a hyperlink) in one of the content elements, potentially causing the client device to be redirected to a malicious website. Moreover, from a human-computer interaction (HCI) perspective, these changes to the content elements and deviations in behavior of the information resources may interfere with a user's experience with the information resource and the application. For instance, if the content control module removes one of the content elements from the information resource, the user is unable to view or interact with the removed content element, thereby decreasing the user's experience with the information resource as originally encoded.

In some implementations, content publishers can include instructions in information resources that can cause client devices to request content from one or more content servers via one or more links. These content servers may be different from host servers hosting content of the content publisher. By including instructions to request content instead of inserting content directly into the information resource prior to transmitting the information resource, content publishers can reduce the latency in serving information resources to client devices as well as reduce the amount of network traffic. Some content control modules executing on client devices can interfere in the client device's ability to transmit the requests for content from the one or more content servers by either modifying the links to the content servers to other or unknown content servers or by preventing any request to be transmitted to any content server. As a result, the client device may be unable to access or display all of the content items the content publisher desired to include in the information resource of the content publisher.

To circumvent some of the potential harm of the content control modules, the proposed system can exploit some of the weaknesses of the content control modules (e.g., the presentation restrictor 165 as detailed herein in Section B). Each new content element may lead to the content control module recalculating hash values and processing the content element using image processing algorithms anew to determine whether to restrict, resulting in consumption of computing power and lag. This may also result in the delay in a confirmation of receipt ping for the content element. If the confirmation of receipt ping is delayed for the content element, a server can generate an edited version and send the edited version of the content element. The server can edit the file name or change the visual properties of the content element. The hash value of the bit stream corresponding to the edited version of the content element may thus be different from the previous hash value, thereby triggering the content control module at the client device to re-run the image processing algorithm. This may degrade the performance of the content control module running at the client device. By degrading the performance of the content control module running at the client device, use of the content control module may be constrained. Inhibiting the use of the content control module may allow a content provider and content publisher to retain control of how content is displayed to a user on the respective client device. This may, for instance, provide improved provision of a user interface experience or may ensure that requirements as to how content is displayed are met.

Figure 6:
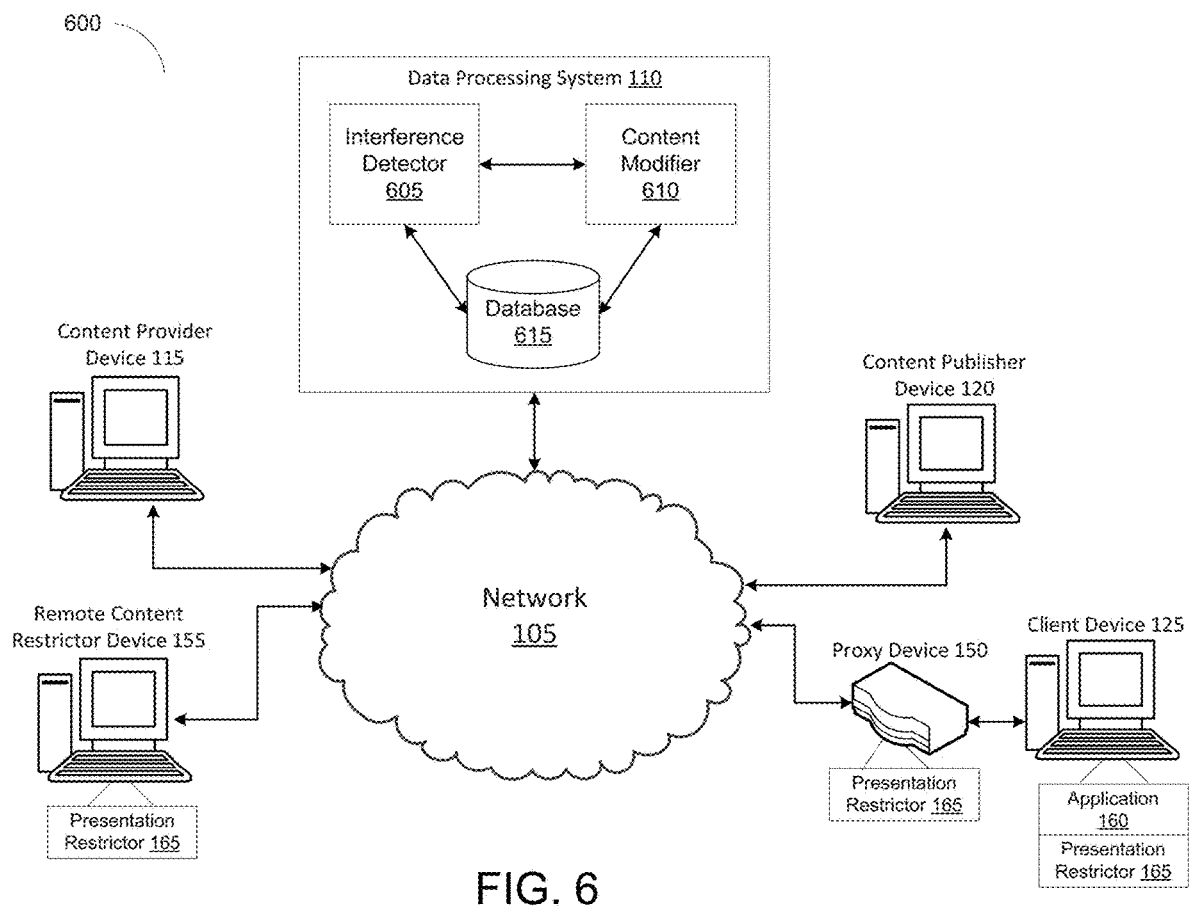
FIG. 6 is a block diagram depicting a system for deploying countermeasures against scripts interfering with the integrity of information resources, according to an illustrative implementation.

Referring now to FIG. 6, FIG. 6 is a block diagram depicting a system 600 for deploying countermeasures against scripts interfering with the integrity of information resources, according to an illustrative implementation. The system 600 may include some or all the devices, components, and modules of environment 100, such as the network 105, the data processing system 110 including the content request module 130, the resource assembler module 135, the database 140, the content provider device 115, the content publisher device 120, the client device 125, the proxy device 150, and the remote content restrictor device 155.

In system 600, the data processing system 110 can also include an interference detector 605, a content modifier 610, and a database 615. The interference detector 605 and the content modifier 610 can include at least one processing unit, server, virtual server, circuit, engine, agent, appliance, or other logic device, such as programmable logic arrays configured to communicate with the database 145 or the database 615 and with other computing devices (e.g., the content provider device 115, the content publisher device 120, or the client device 125) via the network 105. The interference detector 605 and the content modifier 610 can include or execute at least one computer program or at least one script. The interference detector 605 and the content modifier 610 can be separate components, a single component, or part of the data processing system 110. The interference detector 605 and the content modifier 610 can include combinations of software and hardware, such as one or more processors configured to execute one or more scripts. The interference detector 605 and the content modifier 610 can interface with the content request module 130 and the resource assembler module 135 in selecting and generating content elements and information resources to provide to devices connected to the network 105.

The data processing system 110 can also include one or more databases 615 for storing properties of content elements (e.g., content element 210A-N) and information resources. The databases 615 can be local to the data processing system 110. In some implementations, the databases 615 can be remote to the data processing system 110 but can communicate with the data processing system 110 via the network 105. The databases 615 can include the properties of the information resources and content elements to be included in information resources, among others, to serve to a client device 125, such as information resources and content elements selected and generated by the content request module 130 and the resource assembler module 135. The database 615 can store the information resources and content elements generated or modified by the content request module 130 and the resource assembler module 135 or any other component of the data processing system 110. In some implementations, the database 615 may be the same as the database 145.

To preserve the integrity of information resources, the interference detector 605 can identify a first content element (e.g., content element 210A-N) on an information resource (e.g., information resource 205). The information resource and the first content element may have been previously transmitted or provided to a client device 125 connected to the network 105. The information resource may correspond to a binary sequence. The first content may correspond to a first bit stream. The presentation restrictor 165 (or any other content control module) executing on the client device 125, the proxy device 145, or the remote content restrictor device 155 may have interfered with the presentation or inclusion of the first content element on the information resource. In some implementations, the presentation restrictor 165 may have applied a content restriction policy to the first content element on the information resource, as detailed herein in Section B.

In some implementations, the interference detector 605 can identify a subset of content elements included in the information resource for further analysis. The interference detector 605 identify an element type for each content element included in the information resource. The element type may include one of body, paragraph, division, section, inline frame, image, canvas, applet, script, audio, video, table, and list, among others. The element type may correspond to an HTML tag (e.g., "<iframe>" for inline frames). The element types to be further analyzed may include those that are most likely to be modified by the presentation restrictor 165 (e.g., inline frames, audios, videos, images, etc.). The interference detector 605 can identify the subset of content elements matching the element type. In this manner, the interference detector 605 may reduce the number of content elements to be processed to those that are most likely to be modified by the presentation restrictor 165, thereby freeing up computing resources for the data processing system 110.

In some implementations, the interference detector 605 can identify a bit stream corresponding to the first content element included in the information resource. The information resource may correspond to a binary sequence (e.g., a byte array or byte stream). Each content element included in the information resource may correspond to a portion of the binary sequence. In some implementations, the interference detector 605 can access the binary sequence corresponding to the information resource. In some implementations, the interference detector 605 can access the portion of the binary sequence corresponding to one of the content elements. In some implementations, the interference detector 605 can access the portion of the binary sequence corresponding to the subset of content elements identified as matching the element type to be further analyzed. In some implementations, the interference detector 605 can access the database 615 for the information resource, the content elements, and the corresponding binary sequence.

With the content element identified on the information resource, the interference detector 605 can determine any interference to a rendering of the first content element on the information resource. The interference to the rendering of the first content element may include disabling, inhibiting, or otherwise modifying the display or the presentation of the content element in manner on the client device 125. The interference may be due to the presentation restrictor 165 executing on the client device 125, the proxy device 145, or the remote content restrictor device 150. The interference detector 605 can employ any number or combination of techniques to determine the occurrence of such interference by the presentation restrictor 165.

Using a time of transmission of the content element and a time of any acknowledgement responses, the interference detector 605 can determine the interference to the rendering of the content element on the information resource. Each information resource may include a request script for requesting insertion of content into the information resource. In response to receiving the information resource, the request script may cause the client device 125 to transmit a request for content to the data processing system 110. Each content element may include an acknowledgement response script. Upon receipt of the content element, the acknowledgement response script may cause the client device 125 executing the application 160 to transmit or send back an acknowledgement response (e.g., a pingback) to the data processing system 110 or the content provider device 115. The time of transmission of the content element and the time of receipt of a request for content or any acknowledgement responses may be stored in the database 140 or the database 615.

Any irregularity in the time of transmission of the content element to a client device 125, the time of receipt of a request for content associated with the content element from the client device 125, and the time of receipt of any acknowledgement responses from the client device 125 may indicate execution of the presentation restrictor 165 at the client device 125. Performing the functionalities of the presentation restrictor 165 on the client device 125 may lead to a longer time in receipt of any acknowledgement response than without the presentation restrictor 165. The interference detector 605 can compare various times related to transmission of the content element and the information resource and receipt of any acknowledgement responses associated with the content element in determining whether the rendering of the content element was interfered. The comparison may be performed in real time or at specified time intervals. In some implementations, the response of a first content element can be tied to the content publisher device 125 making the next information resource available, preventing a malicious client renderer (e.g., presentation restrictor 165) from waiting an arbitrary amount of time before sending the response. As a result, the malicious renderer using a hash-based approach may be as slow and inefficient as a non-hash-based "brute force" approach to avoid detection by the interference detector 605.

In some implementations, the interference detector 605 can determine the occurrence of interference to the rendering of the first content element on the information resource from a lack of receipt of the request for content or a lack of receipt of the acknowledgement response for the first content element from the client device 125. The lack of receipt of the request for content or of the receipt of the acknowledgement response for the first content element from the client device 125 may indicate that the presentation restrictor 165 altered the behavior of the first content element or the information resource thereon. To that end, for each content element, the interference detector 605 can access the database 615 to determine whether the information resource was transmitted or provided to the client device 125. The interference detector 605 can determine whether the request for content associated with the first content element was received from the client device 125. If the request for content was received from the client device 125, the interference detector 605 can analyze the time of receipt of the request, among other factors, to determine the interference of the first content element. If the request for content was not received from the client device 125, the interference detector 605 can determine the occurrence of interference to the rendering of the first content element on the information resource on the client device. For each content element, the interference detector 605 can also access the database 615 to determine whether the acknowledgement response associated with the first content element was received from the client device 125. If the acknowledgement response was received from the client device 125, the interference detector 605 can analyze the time of acknowledgement response, among other factors, to determine the interference of the first content element. If the acknowledgement response was not received from the client device 125, the interference detector 605 can determine the occurrence of interference to the rendering of the first content element on the information resource on the client device.

In some implementations, the interference detector 605 can compare a time elapsed between a time of transmission of the first content element to a client device 125 to a time of receipt of an acknowledgement response for the first content element from the client device 125 to determine an occurrence of interference. The interference detector 605 access the database 140 or the database 615 for the time of transmission and the time of receipt of the acknowledgement response. The interference detector 605 can identify the time of transmission of the first content element to the client device 125. The time of transmission of the first content element may correspond to the time that the data processing system 110 or the content provider device 115 transmitted or otherwise provided the first content element to the client device 125. The interference detector 605 can identify the time of the receipt of the acknowledgement response. The time of the receipt of the acknowledgement response may correspond to the time that the client device 125 processing the first content element transmitted the acknowledgement response back to the data processing system 110 or the content provider device 115. The interference detector 605 can calculate a time elapsed between the time of transmission of the first content element and the time of receipt of the acknowledgement response. The interference detector 605 can compare the calculated time elapsed to a predetermined threshold (e.g., microsecond to millisecond range). If the interference detector 605 determines that the calculated time elapsed is greater than or equal to the predetermined threshold, the interference detector 605 can determine that an occurrence of interference to the rendering of the first content element on the information resource. If the interference detector 605 determines that the calculated time elapsed is less than the predetermined threshold, the interference detector 605 can determine that a lack of an interference to the rendering of the first content element on the information resource.

In some implementations, the interference detector 605 can compare an average time elapsed between times of transmissions of the first content element to a multitude of client devices 125 to times of receipts of acknowledgement responses from the client devices to determine an occurrence of the interference. The interference detector 605 access the database 140 or the database 615 for the times of transmission and the times of receipt of the acknowledgement response for each client device 125. The interference detector 605 can calculate an average time elapsed between the times of transmission of the first content element and the times of receipt of the acknowledgement responses across the plurality of client devices 125. The interference detector 605 can compare the average time elapsed to a predetermined threshold (e.g., microsecond to millisecond range). If the interference detector 605 determines that the average time elapsed is greater than or equal to the predetermined threshold, the interference detector 605 can determine that there was an occurrence of interference to the rendering of the first content element on the information resource across the multitude of client devices 125. If the interference detector 605 determines that the average time elapsed is less than the predetermined threshold, the interference detector 605 can determine that a lack of an interference to the rendering of the first content element on the information resource across the plurality of client devices 125.

In some implementations, the interference detector 605 can compare the first time elapsed between a first transmission and a second transmission of the first content element to the second time elapsed between a first receipt and a second receipt of the acknowledgement response for the first content element. A difference in the first time elapsed and a second time elapsed may indicate that the presentation restrictor 165 may be hindering with the rendering or insertion of the first content element onto the information resource. The presentation restrictor 165 may have used a rendering-based restriction policy (e.g., image processing techniques) to analyze the first content element to determine whether to apply a content restriction policy to the content element, upon the first receipt of the first content element. Subsequently, the presentation restrictor 165 may have used a hashing function to identify whether the first content element corresponds to an element identifier on a restricted content database (e.g., the local restricted content database 240 or the remote restricted content database 245). The performance of image processing algorithms may consume a greater amount of time than calculation of hash values.

To identify any differences in the interval between transmission of the first content element and receipt of acknowledgement response times, the interference detector 605 can identify a first time of transmission of the first content element to the client device 125. The interference detector 605 can identify a first time of receipt of a first acknowledgement response for the first content element from the client device 125. The interference detector 605 can calculate a first time elapsed between the first time of transmission of the first content element to the client device 125 and the first time of the receipt of the first acknowledgement response for the content element. The interference detector 605 can identify a second time of transmission of the first content element to the client device 125. The interference detector 605 can identify a second time of receipt of a second acknowledgement response for the first content element from the client device 125. The interference detector 605 can calculate a second time elapsed between the second time of transmission of the first content element to the client device 125 and the second time of receipt of the second acknowledgement response for the content element from the client device 125. In some implementations, the first time elapsed and the second time elapsed may be calculated using the times of transmissions of first content element and receipt of acknowledgement responses across a plurality of client devices 125. The interference detector 605 can calculate a difference between the first time elapsed and the second time elapsed. The interference detector 605 can compare the difference to a predetermined threshold. If the interference detector 605 determines that the difference is greater than or equal to the predetermined threshold, the interference detector 605 can determine that there was an occurrence of interference to the rendering of the first content element on the information resource. If the interference detector 605 determines that the difference is less than the predetermined threshold, the interference detector 605 can determine that a lack of an interference to the rendering of the first content element on the information.

In some implementations, the interference detector 605 can compare an expected time of receipt of a request for the first content element to an actual time of receipt of the request for the first content element to determine the interference to the rendering of the first content element. The presentation restrictor 165 running on the client device 125 may have altered the behavior of the content element or the information resource thereon. Consequently, the client device 125 may be caused to transmit a request for the first content element subsequent to receiving the information resource at a time later than without the presentation restrictor 165. To account for the alteration of behavior, the interference detector 605 can access the database 615 to identify an actual time of the receipt of the request for content to insert the first content element onto the information resource from the client device 125. The interference detector 605 can also identify an actual time elapsed between the transmission of the information resource to the client device 125 and the receipt of the request for content from the client device 125. The interference detector 605 can determine or calculate an expected time of receipt of the request for content associated with the content element from the client device 125 using any number of factors. The factors may include network bandwidth of the network 105, network latency for the network 105, device type for the client device 125, and device configuration parameters of the client device 125, among others. The interference detector 605 can also determine or calculate an expected time elapsed between the transmission of the information resource to the client device 125 and the receipt of the request for content from the client device 125. The interference detector 605 can compare the expected time to the actual time of receipt of the request for content. In some implementations, the interference detector 605 can calculate a difference between the expected time and the actual time of receipt of the request for content. If the interference detector 605 determines that the difference is greater than or equal to the predetermined threshold, the interference detector 605 can determine that there was an occurrence of interference to the rendering of the first content element on the information resource. If the interference detector 605 determines that the difference is less than the predetermined threshold, the interference detector 605 can determine that a lack of an interference to the rendering of the first content element on the information.

In some implementations, the interference detector 605 can compare an expected time of receipt of an acknowledgement response for the first content element to an actual time of receipt of the acknowledgement response for the first content element to determine the interference to the rendering of the first content element. The presentation restrictor 165 running on the client device 125 may have altered the behavior of the content element or the information resource thereon. Consequently, the client device 125 may be caused to transmit the acknowledgement response for the first content element subsequent to receiving the content element at a time later than without the presentation restrictor 165. To account for the alteration of behavior, the interference detector 605 can access the database 615 to identify an actual time of the receipt of the acknowledgement response for the first content element from the client device 125. The interference detector 605 can also identify an actual time elapsed between the transmission of the information resource to the client device 125 and the receipt of the acknowledgement response from the client device 125. The interference detector 605 can determine or calculate an expected time of receipt of the acknowledgement response from the client device 125 using any number of factors. The factors may include network bandwidth of the network 105, network latency for the network 105, device type for the client device 125, and device configuration parameters of the client device 125, among others. The interference detector 605 can also determine or calculate an expected time elapsed between the transmission of the information resource to the client device 125 and the receipt of the acknowledgement response from the client device 125. The interference detector 605 can compare the expected time to the actual time of acknowledgement response for the first content element. In some implementations, the interference detector 605 can calculate a difference between the expected time and the actual time of receipt of the acknowledgement response for the first content element. If the interference detector 605 determines that the difference is greater than or equal to the predetermined threshold, the interference detector 605 can determine that there was an occurrence of interference to the rendering of the first content element on the information resource. If the interference detector 605 determines that the difference is less than the predetermined threshold, the interference detector 605 can determine that a lack of an interference to the rendering of the first content element on the information.

In some implementations, the interference detector 605 can identify differences in behavior with respect to the first content element from subsets of client devices 125 to determine the interference to the first content element on the information resource. A first subset of client devices 125 may execute the presentation restrictor 165 or otherwise may be affected by the presentation restrictor 165 in processing the information resource and the content elements thereon. A second subset of client devices 125, on the other hand, may not have the presentation restrictor 165 executing thereon. As such, the first subset of client devices 125 may consume a different amount of time in processing and analyzing the content element than the second subset of client devices 125. To account for the differences in behavior, for each client device 125, the interference detector 605 can identify a time of transmission of the first content element, a time of receipt of a request for content, and a time of receipt of the acknowledgment response. Using the identified values as parameters, the interference detector 605 can apply a clustering algorithm (e.g., k-nearest neighbor algorithm, expectation-maximization, etc.) to identify subsets of client devices 125. For each subset, the interference detector 605 can calculate a mean value for the time of transmission of the first content element, the time of receipt of a request for content, and the time of receipt of the acknowledgment response. The interference detector 605 can calculate a difference in the mean value across the subsets of client devices 125 identified using the clustering algorithm. The interference detector 605 can compare the difference to a predetermined margin. If the interference detector 605 determines that the difference is greater than or equal to the predetermined margin, the interference detector 605 can determine that there was an occurrence of interference to the rendering of the first content element on the information resource. If the interference detector 605 determines that the difference is less than the predetermined margin, the interference detector 605 can determine that a lack of an interference to the rendering of the first content element on the information.

In response to detecting the interference of the rendering of the first content element on the information resource, the content modifier 610 can generate a second content element for a subsequent information resource based on the first content element. The second content element may correspond to a second bit stream different from the first bit stream. As the presentation restrictor 165 calculates a hash value of the bit streams to generate element identifiers for each content element, the second bit stream being different from the first bit stream may cause the presentation restrictor 165 to re-run a rendering-based restriction policy (e.g., using image processing algorithms) to analyze the second content element. Repeatedly applying a rendering-based restriction policy to determine whether to apply the content restriction policy to various content elements with different bit streams may degrade the performance of the device executing the presentation restrictor 165. To this end, the content modifier 610 can modify the first content element to generate the second element with a second bit stream different from the first bit stream using any number and combination of techniques in accordance with a content modification policy.

The second content element generated by the content modifier 610 may appear visually dissimilar similar to the first content element but convey the same information (e.g., same text with different background color or same image with differing border width), which results in a change from the first bit stream to the second bit stream. In some implementations, the content modifier 610 can modify a visual characteristic (e.g., font, font size, background color, border width, dimensions, position on the information resource, etc.) of the first content element to generate the second content element. The modification of the visual characteristic may result in a change from the first bit stream to the second bit stream. The content modifier 610 can identify the visual characteristic of the first content element from the database 615. The content modifier 610 can set the visual characteristic of the first content element to a value different from a default value in accordance with the content modification policy. The content modification policy may specify which values of the visual characteristics to set based on the default value (e.g., changing the background color from light green to light blue).

The second content element generated by the content modifier 610 may appear visually similar to the first content element, conveying the same information but with different function behavior, to cause a change from the first bit stream to the second bit stream. In some implementations, the content modifier 610 can modify a file pathname of the first content element to generate the second content element. The file pathname can correspond to a source address of the first content element. The file pathname can include a protocol (e.g., http, https, ftp, etc.), a hostname (e.g., www.example.com), and a file name (e.g., /samplecontent.html). The content modifier 610 can identify the protocol, the hostname, and the file name from the file pathname. In some implementations, the content modifier 610 can modify one of the hostname and the file name to generate the second content element. The content modifier 610 can reproduce or regenerate the first content element with the modified file pathname to create the second content element. In some implementations, the content modifier 610 can modify a redirect link of the first content element to generate the second content element. The redirect link may include a source address included in the first content element and may be configured to cause an application 160 running on the client device 125 to retrieve content corresponding the source address. The content modifier 610 can identify the redirect link of the first content element. The content modifier 610 can reproduce or regenerate the first content element with the modified redirect link to create the second content element.

The second content element generated by the content modifier 610 may correspond to code or markup different from code or markup of the first content element which results in a change from the first bit stream to the second bit stream. The content modifier 610 can modify the code segment corresponding to the first content element or the information resource associated with the first content element to generate the second content element. The code segment may include one or more scripts associated with the first content element. The content modifier 610 can reproduce or regenerate the code segment with the modifications of the first content element to create the second content element.

In some implementations, the content modifier 610 can identify an acknowledgement response code from the code segment of the first content element. The content modifier 610 can modify an acknowledgement response code from the code segment of the first content element to generate the second content element. The acknowledgement response code, once received by the client device 125 and processed by the application 160 executed thereon, may cause the client device 125 to transmit an acknowledgement response (e.g., pingback) to the data processing system 110 or the content provider device 115.

In some implementations, the content modifier 610 can identify a content request code from the code segment of the information resource. The content modifier 610 can modify a content request code from the code segment of the information resource to generate the second content element. The content request code, once received by the client device 125 and processed by the application 160 executed thereon, may cause the client device 125 to transmit a request for content to the data processing system 110 or the content provider device 115 to insert a content element into the information resource.

In some implementations, the content modifier 610 can add, insert, or append appendage code into the code segment for the first content element to generate the second content element. The appendage code may be nonfunctional code that does not change or alter the behavior of the second content element relative to the first content element. The appendage code may result in a change from the first bit stream to the second bit stream.

To verify whether, in fact, the bit stream has been altered, the content modifier 610 can determine whether the second bit stream for the first content element differs from the first bit stream for the first content element. The content modifier 610 can identify the first bit stream corresponding to the first content element. The content modifier 610 can identify the second bit stream corresponding to the second content element. The content modifier 610 can identify or determine a number of bits differing between the first bit stream and the second bit stream. The content modifier 610 can compare the number of different bits to a threshold number. If the content modifier 610 determines that the number of different bits is greater than or equal to the threshold number, the content modifier 610 can permit transmission or provision of the second content element to the client device 125. If the content modifier 610 determines that the number of different bits is less than the threshold number, the content modifier 610 can restrict transmission nor provision of the second content element to the client device 125. The content modifier 610 can also re-run the modification of the first content element to generate another content element.

In some implementations, the content modifier 610 can identify a distribution of bits differing between the first bit stream and the second bit stream. The content modifier 610 can compare the distribution of differing bits to a predetermined threshold. If the content modifier 610 determines that the distribution of differing bits is greater than or equal to the predetermined threshold, the content modifier 610 can permit transmission or provision of the second content element to the client device 125. If the content modifier 610 determines that the distribution of differing bits is less than the predetermined threshold, the content modifier 610 can restrict transmission for provision of the second content element to the client device 125. The content modifier 610 can also re-run the modification of the first content element to generate another content element.

With the second content element generated, the content modifier 610 can transmit the subsequent information resource including the second content element to the client device 125. In some implementations, the data processing system 110 can receive a request for an information resource from the client device 125. In response to receiving the request, the data processing system 110 can transmit the subsequent information resource. In some implementations, the data processing system 110 can receive a request for content to insert into the information resource from the client device 125. In response to the request for content, the content modifier 610 can transmit the second content element included in the subsequent information resource to the client device 125. With the second content element corresponding to the second bit stream as different from the first bit stream, receipt of the second content element by the client device 125 may cause the presentation restrictor 165 executing on the client device 125 to apply the rendering-based restriction policy.

Figure 7:
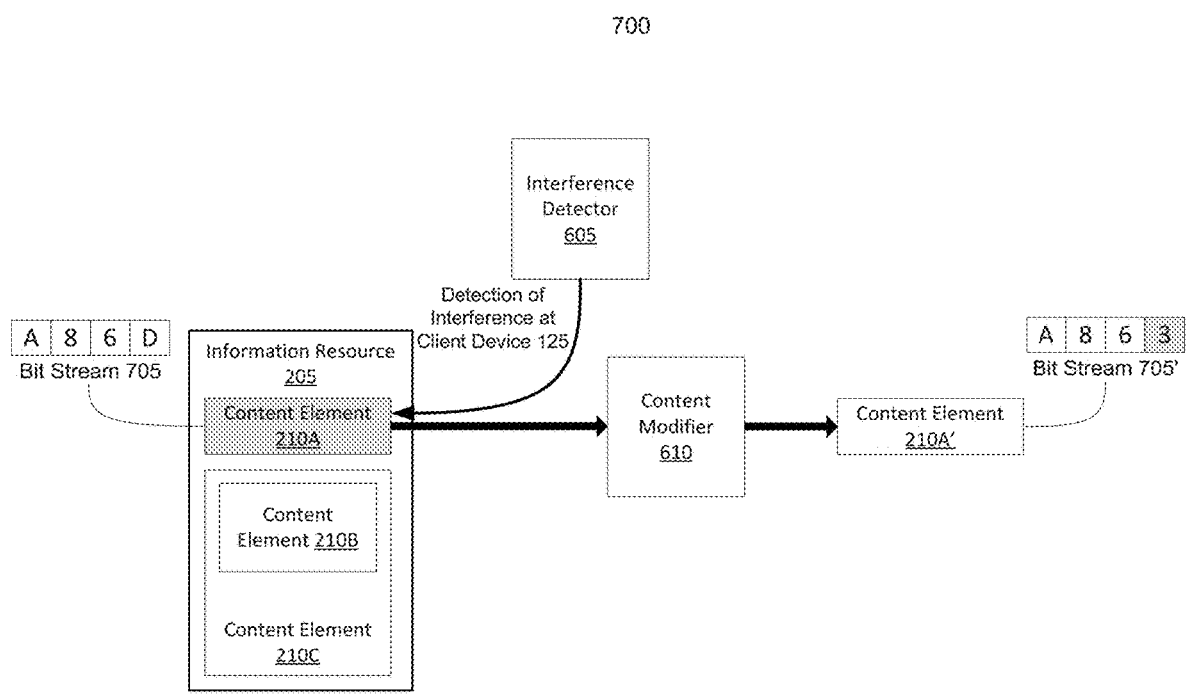
FIG. 7 is a block diagram depicting a flow process of content elements of an information resource modified by the system for deploying countermeasures against scripts interfering with the integrity of information resources, according to an illustrative implementation.

Referring now to FIG. 7, FIG. 7 is a block diagram depicting a flow process 700 of content elements of an information resource modified by the system 600 for deploying countermeasures against scripts interfering with the integrity of information resources, according to an illustrative implementation. As depicted in the flow process 700 for FIG. 7, the information resource 205 may include a first content element 210A, a second content element 210B, and a third content element 210C. Each of the first content element 210A, the second content element 210B, and the third content element 210C may correspond to a binary sequence or bit stream (depicted in hexadecimal form). The first content element 210A may correspond to the bit stream 705 (e.g., "xA86D").

In the context of FIG. 6, the presentation restrictor 165 may have applied a content restriction policy to the first content element 210A, thereby interfering with the rendering of the content element 210A on the information resource 205 at the client device 125. Using the techniques described herein, the interference detector 605 can detect the interference of the rendering of the first content element 210A. Having detected the interference to the first content element 210A, the content modifier 610 can modify the first content element 210A to generate a different version of the content element 210A'. The modification of the content element 210A may result in a change to the bit stream 705. The bit stream 705 ("xA86D") corresponding to the content element 210A may be changed to another bit stream 705' ("xA863") corresponding to the modified content element 210A'. The change to the bit stream 705 for the content element 210A may cause the presentation restrictor 165 running on the client device 125 to re-run a rendering-based restriction policy (e.g., image processing algorithms). This, in turn, may result in reducing the performance of the client device 125 and the presentation restrictor 165.

Figure 8:
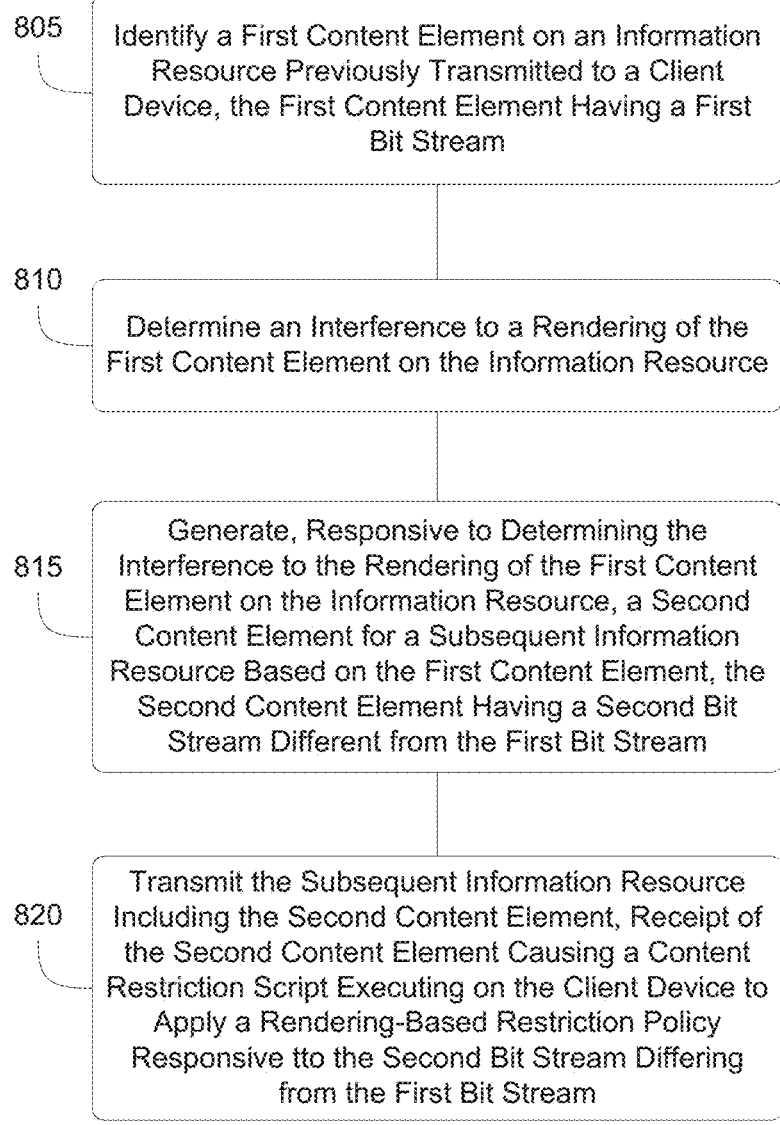
FIG. 8 is a flow diagram depicting a method of countermeasures against scripts interfering with the integrity of information resources, according to an illustrative implementation.

Referring now to FIG. 8, FIG. 8 is a flow diagram depicting a method 800 of countermeasures against scripts interfering with the integrity of information resources, according to an illustrative implementation. The functionality described herein with respect to method 800 can be performed or otherwise executed by the system 100 as shown in FIG. 1, the system 600 as shown in FIG. 6, or a computing device as shown in FIG. 10, or any combination thereof. In brief overview, a data processing system can identify a first content element on an information resource previously transmitted to a client device (BLOCK 805). The first content element can have a first bit stream. The data processing system can determine an interference to a rendering of the first content element on the information resource (BLOCK 810). The data processing system can generate, responsive to determining the interference to the rendering of the first content element on the information resource, a second content element for a subsequent information resource based on the first content element (BLOCK 815). The second content element can have a second bit stream different from the first bit stream. The data processing system can transmit, to the client device, the subsequent information resource including the second content element (BLOCK 820). Receipt of the second content element can cause a content restriction script executing on the client device to apply a rendering-based restriction policy responsive to the second bit stream differing from the first bit stream.

In further detail, the data processing system can identify a first content element on an information resource previously transmitted to a client device (BLOCK 805). The first content element can have a first bit stream. To preserve the integrity of information resources, the data processing system can identify a first content element on an information resource. The information resource and the first content element may have been previously transmitted or provided to a client device connected to the network. The information resource may correspond to a binary sequence. The first content may correspond to a first bit stream. The presentation restrictor (or any other content control module) executing on the client device, the proxy device, or the remote content restrictor device may have interfered with the presentation or inclusion of the first content element on the information resource. In some implementations, the presentation restrictor may have applied a content restriction policy to the first content element on the information resource, as detailed herein in Section B.

In some implementations, the data processing system can identify a subset of content elements included in the information resource for further analysis. The data processing system identifies an element type for each content element included in the information resource. The element type may include one of body, paragraph, division, section, inline frame, image, canvas, applet, script, audio, video, table, and list, among others. The element type may correspond to an HTML tag (e.g., "<iframe>" for inline frames). The element types to be further analyzed may include those that are most likely to be modified by the presentation restrictor (e.g., inline frames, audios, videos, images, etc.). The data processing system can identify the subset of content elements matching the element type. In this manner, the data processing system may reduce the number of content elements to be processed to those that are most likely to be modified by the presentation restrictor, thereby freeing up computing resources for the data processing system.

In some implementations, the data processing system can identify a bit stream corresponding to the first content element included in the information resource. The information resource may correspond to a binary sequence (e.g., byte array or byte stream). Each content element included in the information resource may correspond to a portion of the binary sequence. In some implementations, the data processing system can access the binary sequence corresponding to the information resource. In some implementations, the data processing system can access the portion of the binary sequence corresponding to one of the content elements. In some implementations, the data processing system can access the portion of the binary sequence corresponding to the subset of content elements identified as matching the element type to be further analyzed. In some implementations, the data processing system can access the database for the information resource and the content elements, and the corresponding binary sequence.

The data processing system can determine an interference to a rendering of the first content element on the information resource (BLOCK 810). With the content element identified on the information resource, the data processing system can determine an interference to a rendering of the first content element on the information resource. The interference to the rendering of the first content element may include disabling, inhibiting, or otherwise modifying the display or the presentation of the content element in any manner on the client device. The interference may be due to the presentation restrictor executing on the client device, the proxy device, or the remote content restrictor device 150. The data processing system can employ any number or combination of techniques to determine the occurrence of such interference by the presentation restrictor.

Using a time of transmission of the content element and a time of any acknowledgement responses, the data processing system can determine the interference to the rendering of the content element on the information resource. Each information resource may include a request script for requesting the insertion of content into the information resource. In response to receiving the information resource, the request script may cause the client device to transmit a request for content to the data processing system. Each content element may include an acknowledgement response script. Upon receipt of the content element, the acknowledgement response script may cause the client device executing the application 160 to transmit or send back an acknowledgement response (e.g., pingback) to the data processing system or the content provider device. The time of transmission of the content element and the time of receipt of a request for content or any acknowledged responses may be stored in the database.

Any irregularity in the time of transmission of the content element to a client device, the time of receipt of a request for content associated with the content element from the client device, and the time of receipt of any acknowledgement responses from the client device may indicate execution of the presentation restrictor at the client device. Performing the functionalities of the presentation restrictor on the client device may lead to a longer time in receipt of any acknowledgement response than without the presentation restrictor. The data processing system can compare various times related to transmission of the content element and the information resource and receipt of any acknowledgement responses associated with the content element in determining whether the rendering of the content element was interfered. The comparison may be performed in real time or at specified time intervals.

In some implementations, the data processing system can determine the occurrence of the interference to the rendering of the first content element on the information resource from a lack of receipt of the request for content or a lack of receipt of the acknowledgement response for the first content element from the client device. The lack of receipt of the request for content or of the receipt of the acknowledgement response for the first content element from the client device may indicate that the presentation restrictor altered the behavior of the first content element or the information resource thereon. To that end, for each content element, the data processing system can access the database to determine whether the information resource was transmitted or provided to the client device. The data processing system can determine whether the request for content associated with the first content element was received from the client device. If the request for content was received from the client device, the data processing system can analyze the time of receipt of the request, among other factors, to determine the interference of the first content element. If the request for content was not received from the client device, the data processing system can determine the occurrence of the interference to the rendering of the first content element on the information resource on the client device. For each content element, the data processing system can also access the database to determine whether the acknowledgement response associated with the first content element was received from the client device. If the acknowledgement response was received from the client device, the data processing system can analyze the time of acknowledgement response, among other factors, to determine the interference of the first content element. If the acknowledgement response was not received from the client device, the data processing system can determine the occurrence of the interference to the rendering of the first content element on the information resource on the client device.

In some implementations, the data processing system can compare a time elapsed between a time of transmission of the first content element to a client device to a time of receipt of an acknowledgement response for the first content element from the client device to determine an occurrence of the interference. The data processing system accesses the database for the time of transmission and the time of receipt of the acknowledgement response. The data processing system can identify the time of transmission of the first content element to the client device. The time of transmission of the first content element may correspond to the time that data processing system or the content provider device transmitted or otherwise provided the first content element to the client device. The data processing system can identify the time of the receipt of the acknowledgement response. The time of the receipt of the acknowledged response may correspond to the time that the client device processing the first content element transmitted the acknowledgement response back to the data processing system or the content provider device. The data processing system can calculate a time elapsed between the time of transmission of the first content element and the time of receipt of the acknowledgement response. The data processing system can compare the calculated time elapsed to a predetermined threshold (e.g., microsecond to millisecond range). If the data processing system determines that the calculated time elapsed is greater than or equal to the predetermined threshold, the data processing system can determine that an occurrence of an interference to the rendering of the first content element on the information resource has taken place. If the data processing system determines that the calculated time elapsed is less than the predetermined threshold, the data processing system can determine that a lack of an interference to the rendering of the first content element on the information resource has taken place.

In some implementations, the data processing system can compare an average time elapsed between times of transmissions of the first content element to a multitude of client devices to times of receipts of acknowledgement responses from the client devices to determine an occurrence of the interference. The data processing system accesses the database for the times of transmission and the times of receipt of the acknowledgement response for each client device. The data processing system can calculate an average time elapsed between the times of transmission of the first content element and the times of receipt of the acknowledgement responses across the plurality of client devices. The data processing system can compare the average time elapsed to a predetermined threshold (e.g., microsecond to millisecond range). If the data processing system determines that the average time elapsed is greater than or equal to the predetermined threshold, the data processing system can determine that an occurrence of an interference to the rendering of the first content element on the information resource across the multitude of client devices has taken place. If the data processing system determines that the average time elapsed is less than the predetermined threshold, the data processing system can determine that a lack of an interference to the rendering of the first content element on the information resource across the plurality of client devices has taken place.

In some implementations, the data processing system can compare a first time elapsed between a first transmission and a second transmission of the first content element to a second time elapsed between a first receipt and a second receipt of the acknowledgement response for the first content element. A difference in the first time elapsed and a second time elapsed may indicate that the presentation restrictor may be hindering with the rendering or insertion of the first content element onto the information resource. The presentation restrictor may have used a rendering-based restriction policy (e.g., image processing techniques) to analyze the first content element to determine whether to apply a content restriction policy to the content element, upon the first receipt of the first content element. Subsequently, the presentation restrictor may have used a hashing function to identify whether the first content element corresponds to an element identifier on a restricted content database. The performance of image processing algorithms may consume a greater amount of time than the calculation of hash values.

To identify any differences in the interval between transmission of the first content element and the receipt of acknowledgement response times, the data processing system can identify a first time of transmission of the first content element to the client device. The data processing system can identify a first time of receipt of a first acknowledgement response for the first content element from the client device. The data processing system can calculate a first time elapsed between the first time of transmission of the first content element to the client device and the first time of the receipt of the first acknowledgement response for the content element. The data processing system can identify a second time of transmission of the first content element to the client device. The data processing system can identify a second time of receipt of a second acknowledgement response for the first content element from the client device. The data processing system can calculate a second time elapsed between the second time of transmission of the first content element to the client device and the second time of receipt of the second acknowledgement response for the content element from the client device. In some implementations, the first time elapsed and the second time elapsed may be calculated using the times of transmissions of first content element and receipt of acknowledgement responses across a plurality of client devices. The data processing system can calculate a difference between the first time elapsed and the second time elapsed. The data processing system can compare the difference to a predetermined threshold. If the data processing system determines that the difference is greater than or equal to the predetermined threshold, the data processing system can determine that an occurrence of an interference to the rendering of the first content element on the information resource has taken place. If the data processing system determines that the difference is less than the predetermined threshold, the data processing system can determine that a lack of an interference to the rendering of the first content element on the information has taken place.

In some implementations, the data processing system can compare an expected time of receipt of a request for the first content element to an actual time of receipt of the request for the first content element to determine the interference to the rendering of the first content element. The presentation restrictor running on the client device may have altered the behavior of the content element or the information resource thereon. Consequently, the client device may be caused to transmit a request for the first content element subsequent to receiving the information resource at a time later than without the presentation restrictor. To account for the alteration of behavior, the data processing system can access the database to identify an actual time of the receipt of the request for content to insert the first content element onto the information resource from the client device. The data processing system can also identify an actual time elapsed between the transmission of the information resource to the client device and the receipt of the request for content from the client device. The data processing system can determine or calculate an expected time of receipt of the request for content associated with the content element from the client device using any number of factors. The factors may include network bandwidth of the network, network latency for the network, device type for the client device, and device configuration parameters of the client device, among others. The data processing system can also determine or calculate an expected time elapsed between the transmission of the information resource to the client device and the receipt of the request for content from the client device. The data processing system can compare the expected time to the actual time of receipt of the request for content. In some implementations, the data processing system can calculate a difference between the expected time and the actual time of receipt of the request for content. If the data processing system determines that the difference is greater than or equal to the predetermined threshold, the data processing system can determine that an occurrence of an interference to the rendering of the first content element on the information resource has taken place. If the data processing system determines that the difference is less than the predetermined threshold, the data processing system can determine that a lack of an interference to the rendering of the first content element on the information has taken place.

In some implementations, the data processing system can compare an expected time of receipt of an acknowledgement response for the first content element to an actual time of receipt of the acknowledgement response for the first content element to determine the interference to the rendering of the first content element. The presentation restrictor running on the client device may have altered the behavior of the content element or the information resource thereon. Consequently, the client device may be caused to transmit the acknowledgement response for the first content element subsequent to receiving the content element at a time later than without the presentation restrictor. To account for the alteration of behavior, the data processing system can access the database to identify an actual time of the receipt of the acknowledgement response for the first content element from the client device. The data processing system can also identify an actual time elapsed between the transmission of the information resource to the client device and the receipt of the acknowledgement response from the client device. The data processing system can determine or calculate an expected time of receipt of the acknowledgement response from the client device using any number of factors. The factors may include network bandwidth of the network, network latency for the network, device type for the client device, and device configuration parameters of the client device, among others. The data processing system can also determine or calculate an expected time elapsed between the transmission of the information resource to the client device and the receipt of the acknowledgement response from the client device. The data processing system can compare the expected time to the actual time of acknowledgement response for the first content element. In some implementations, the data processing system can calculate a difference between the expected time to the actual time of receipt of the acknowledgement response for the first content element. If the data processing system determines that the difference is greater than or equal to the predetermined threshold, the data processing system can determine that an occurrence of an interference to the rendering of the first content element on the information resource has taken place. If the data processing system determines that the difference is less than the predetermined threshold, the data processing system can determine that a lack of an interference to the rendering of the first content element on the information has taken place.

In some implementations, the data processing system can identify differences in behavior with respect to the first content element from subsets of client devices to determine the interference to the first content element on the information resource. A first subset of client devices may execute the presentation restrictor or otherwise may be affected by the presentation restrictor in processing the information resource and the content elements thereon. A second subset of client devices, on the other hand, may not have the presentation restrictor executing thereon. As such, the first subset of client devices may consume a different amount of time in processing and analyzing the content element than the second subset of client devices. To account for the differences in behavior, for each client device, the data processing system can identify a time of transmission of the first content element, a time of receipt of a request for content, and a time of receipt of the acknowledgment response. Using the identified values as parameters, the data processing system can apply a clustering algorithm (e.g., k-nearest neighbor algorithm, expectation-maximization, etc.) to identify subsets of client devices. For each subset, the data processing system can calculate a mean value for the time of transmission of the first content element, the time of receipt of a request for content, and the time of receipt of the acknowledgment response. The data processing system can calculate a difference in the mean value across the subsets of client devices identified using the clustering algorithm. The data processing system can compare the difference to a predetermined margin. If the data processing system determines that the difference is greater than or equal to the predetermined margin, the data processing system can determine that an occurrence of an interference to the rendering of the first content element on the information resource has taken place. If the data processing system determines that the difference is less than the predetermined margin, the data processing system can determine that a lack of an interference to the rendering of the first content element on the information has taken place.

The data processing system can generate, responsive to determining the interference to the rendering of the first content element on the information resource, a second content element for a subsequent information resource based on the first content element (BLOCK 815). The second content element can have a second bit stream different from the first bit stream. In response to detecting the interference of the rendering of the first content element on the information resource, the data processing system can generate a second content element for a subsequent information resource based on the first content element. The second content element may correspond to a second bit stream different from the first bit stream. As the presentation restrictor calculates a hash value of the bit streams to generate element identifiers for each content element, the second bit stream being different from the first bit stream may cause the presentation restrictor to re-run a rendering-based restriction policy (e.g., using image processing algorithms) to analyze the second content element. Repeatedly applying rendering-based restriction policy to determine whether to apply the content restriction policy to various content elements with different bit streams may degrade the performance of the device executing the presentation restrictor. To this end, the data processing system can modify the first content element to generate the second element with a second bit stream different from the first bit stream using any number and combination of techniques in accordance with a content modification policy.

The second content element generated by the data processing system may appear visually dissimilar similar to the first content element but convey the same information (e.g., same text with different background color or same image with differing border width) to result a change from the first bit stream to the second bit stream. In some implementations, the data processing system can modify a visual characteristic (e.g., font, font size, background color, border width, dimensions, position on the information resource, etc.) of the first content element to generate the second content element. The modification of the visual characteristic may result in a change from the first bit stream to the second bit stream. The data processing system can identify the visual characteristic of the first content element from the database. The data processing system can set the visual characteristic of the first content element to a value different from a default value in accordance with the content modification policy. The content modification policy may specify which values the visual characteristics will set based on the default value (e.g., changing the background color from light green to light blue).

The second content element generated by the data processing system may appear visually similar to the first content element conveying the same information but with different function behavior to cause a change from the first bit stream to the second bit stream. In some implementations, the data processing system can modify a file pathname of the first content element to generate the second content element. The file pathname can correspond to a source address of the first content element. The file pathname can include a protocol (e.g., http, https, ftp, etc.), a hostname (e.g., www.example.com) and a file name (e.g., /samplecontent.html). The data processing system can identify the protocol, the hostname and the file name from the file pathname. In some implementations, the data processing system can modify one of the hostname and of the file name to generate the second content element. The data processing system can reproduce or regenerate the first content element with the modified file pathname to create the second content element. In some implementations, the data processing system can modify a redirect link of the first content element to generate the second content element. The redirect link may include a source address included in the first content element and may be configured to cause an application 160 running on the client device to retrieve content corresponding the source address. The data processing system can identify the redirect link of the first content element. The data processing system can reproduce or regenerate the first content element with the modified redirect link to create the second content element.

The second content element generated by the data processing system may correspond to code or markup different from code or markup of the first content element to result in a change from the first bit stream to the second bit stream. The data processing system can modify code segments corresponding to the first content element or the information resource associated with the first content element to generate the second content element. The code segment may include one or more script associated with the first content element. The data processing system can reproduce or regenerate the code segment with the modifications of the first content element to create the second content element.

In some implementations, the data processing system can identify an acknowledgement response code from the code segment of the first content element. The data processing system can modify an acknowledgement response code from the code segment of the first content element to generate the second content element. The acknowledgement response code, once received by the client device and processed by the application 160 executed thereon, may cause the client device to transmit an acknowledgement response (e.g., pingback) to the data processing system or the content provider device.

In some implementations, the data processing system can identify a content request code from the code segment of the information resource. The data processing system can modify a content request code from the code segment of the information resource to generate the second content element. The content request code, once received by the client device and processed by the application 160 executed thereon, may cause the client device to transmit a request for content to the data processing system or the content provider device to insert a content element into the information resource.

In some implementations, the data processing system can add, insert, or append appendage code into the code segment for the first content element to generate the second content element. The appendage code may be nonfunctional code that does not change or alter the behavior of the second content element relative to the first content element. The appendage code may result in a change from the first bit stream to the second bit stream.

To verify whether in fact the bit stream has been altered, the data processing system can determine whether the second bit stream for the first content element differs from the first bit stream for the first content element. The data processing system can identify the first bit stream corresponding to the first content element. The data processing system can identify the second bit stream corresponding to the second content element. The data processing system can identify or determine a number of bits differing between the first bit stream and the second bit stream. The data processing system can compare the number of different bits to a threshold number. If the data processing system determines that the number of different bits is greater than or equal to the threshold number, the data processing system can permit transmission or provision of the second content element to the client device. If the data processing system determines that the number of different bits is less than the threshold number, the data processing system can restrict transmission for provision of the second content element to the client device. The data processing system can also re-run the modification of the first content element to generate another content element.

In some implementations, the data processing system can identify a distribution of bits differing between the first bit stream and the second bit stream. The data processing system can compare the distribution of differing bits to a predetermined threshold. If the data processing system determines that the distribution of differing bits is greater than or equal to the predetermined threshold, the data processing system can permit transmission or provision of the second content element to the client device. If the data processing system determines that the distribution of differing bits is less than the predetermined threshold, the data processing system can restrict transmission for provision of the second content element to the client device. The data processing system can also re-run the modification of the first content element to generate another content element.

The data processing system can transmit, to the client device, the subsequent information resource including the second content element (BLOCK 820). Receipt of the second content element can cause a content restriction script executing on the client device to apply a rendering-based restriction policy responsive to the second bit stream differing from the first bit stream. With the second content element generated, the data processing system can transmit the subsequent information resource including the second content element to the client device. In some implementations, the data processing system can receive a request for an information resource from the client device. In response to receiving the request, the data processing system can transmit the subsequent information resource. In some implementations, the data processing system can receive a request for content to insert into the information resource from the client device. In response to the request for content, the data processing system can transmit the second content element included in the subsequent information resource to the client device. With the second content element corresponding to the second bit stream differently from the first bit stream, receipt of the second content element by the client device may cause the presentation restrictor executing on the client device to apply the rendering-based restriction policy.

Figure 9:
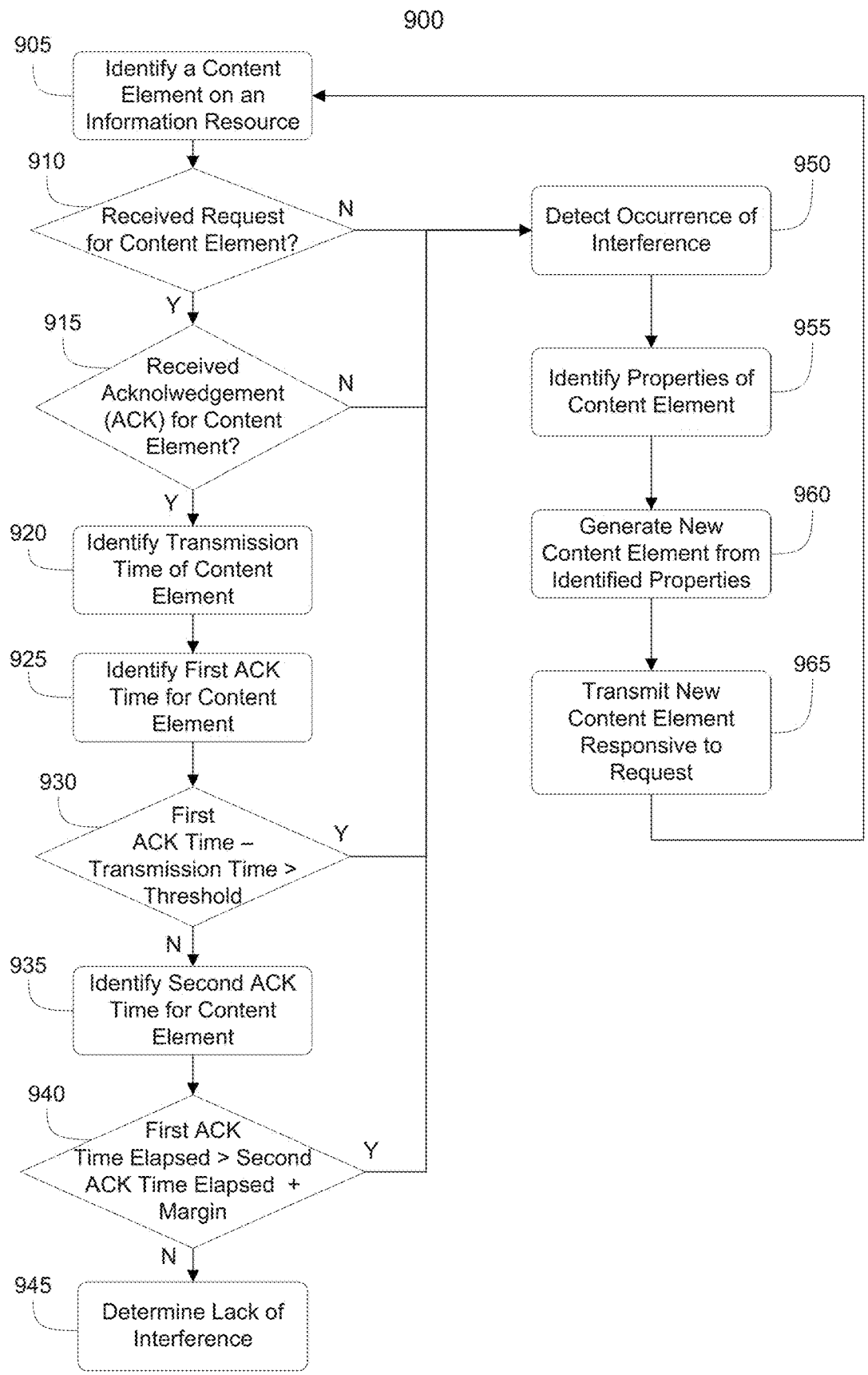
FIG. 9 is a flow diagram depicting a method of countermeasures against scripts interfering with the integrity of information resources, according to an illustrative implementation.

Referring now to FIG. 9, FIG. 9 is a flow diagram depicting a method 900 of countermeasures against scripts interfering with the integrity of information resources, according to an illustrative implementation. The functionality described herein with respect to method 900 can be performed or otherwise executed by the system 100 as shown in FIG. 1, the system 600 as shown in FIG. 6, or a computing device as shown in FIG. 10, or any combination thereof. In overview, the data processing system can identify a content element on an information resource (BLOCK 905). The data processing system can determine whether the request for content was received. (BLOCK 910). If the request for content was received, the data processing system can determine whether an acknowledgement response for the content element was received (BLOCK 915). If the acknowledgement response was received, the data processing system can identify a time of transmission of the content element to the client device (BLOCK 920). The data processing system can identify a time of the first acknowledgement response for the content element from the client device (BLOCK 925). The data processing system can determine whether a difference between the time of the first acknowledgement response and the transmission time is greater than a threshold (BLOCK 930). If the difference between the time of the first acknowledgment response and the transmission time is less than threshold, the data processing system can identify a time for a second acknowledgement response for the content element from the client device. (BLOCK 935). The data processing system can determine whether the time elapsed between the first acknowledgement response time and transmission time is greater than the time elapsed between the second response time and the transmission time by a predetermined margin. (BLOCK 940). If the time elapsed between the first acknowledgement response time and transmission time is greater than the time elapsed between the second response time and the transmission time by a predetermined margin is not greater than the predetermined margin, the data processing system can determine a lack of interference (BLOCK 945).

Otherwise, if the request for content was not received, the acknowledgement response for the content element was not received, the difference between the first acknowledgement response time and the transmission time is greater than the threshold, or if the time elapsed between the first acknowledgement response time and transmission time is greater than the time elapsed between the second response time and the transmission time by the predetermined margin, the data processing system can determine an occurrence of an interference to the content element (BLOCK 945). The data processing system can . . . (BLOCK 950). The data processing system can identify properties of the content element (BLOCK 955). The data processing system can generate a new content element from the identified properties of the initial content element (BLOCK 960). The data processing system can transmit a new content element responsive to another request for content (BLOCK 965).

D. Computing System Architecture

FIG. 10 shows the general architecture of an illustrative computer system 1000 that may be employed to implement any of the computer systems discussed herein (including the data processing system 110 and its components such as the content request module 130, the resource assembler module 135, the interference detector 605, and the content modifier 610, the application 205 and its modules, or the presentation restrictor 165 and its components, the resource parser 215, the element hasher 220, the content restrictor 225, and the rendering restrictor 230) in accordance with some implementations. The computer system 1000 can be used to provide information via the network 105 for display. The computer system 1000 of FIG. 10 comprises one or more processors 1020 communicatively coupled to memory 1025, one or more communications interfaces 1005, and one or more output devices 1010 (e.g., one or more display units) and one or more input devices 10151. The processors 1020 can be included in the data processing system 110 or the other components of the system 110 such as the content request module 130, the resource assembler module 135, the interference detector 605, and the content modifier 610. The processors can be included in the client device 125, the proxy device 145, the remote content restrictor device 155 or their modules, such as the application 160 and the presentation restrictor 165 and its components, the resource parser 215, the element hasher 220, the content restrictor 225, and the rendering restrictor 230.

In the computer system 1000 of FIG. 10, the memory 1025 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 1025 to store information related to the availability of inventory of one or more content units, reservations of one or more content units, among others. The memory 1025 can include the database 145. The processor(s) 1020 shown in FIG. 10 may be used to execute instructions stored in the memory 1025 and, in so doing, also may read from or write to the memory various information processed and or generated pursuant to execution of the instructions.

The processor 1020 of the computer system 1000 shown in FIG. 10 also may be communicatively coupled to or made to control the communications interface(s) 1005 to transmit or receive various information pursuant to execution of instructions. For example, the communications interface(s) 1005 may be coupled to a wired or wireless network, bus, or other communication means and may therefore allow the computer system 1000 to transmit information to or receive information from other devices (e.g., other computer systems). While not shown explicitly in the system of FIG. 1 or FIG. 6, one or more communications interfaces facilitate information flow between the components of the system 1000. In some implementations, the communications interface(s) may be configured (e.g., via various hardware components or software components) to provide a website as an access portal to at least some aspects of the computer system 1000. Examples of communications interfaces 1005 include user interfaces (e.g., web pages), through which the user can communicate with the data processing system 1000.

The output devices 1010 of the computer system 1000 shown in FIG. 10 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or on data received from other sources.

The terms "data processing apparatus", "data processing system", "user device" or "computing device" encompasses all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130, the resource assembler module 135, the interference detector 605, and the content modifier 610 can include or share one or more data processing apparatuses, computing devices, or processors. The application 160, the presentation restrictor 165 and its modules, the resource parser 215, the element hasher 220, the content restrictor 225, and the rendering restrictor 230 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 1000 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. The content request module 130, the resource assembler module 135, the interference detector 605, and the content modifier 610 can be part of the data processing system 110, a single module, a logic device having one or more processing modules, one or more servers, or part of a search engine. In addition, the application 160, and the resource parser 215, the element hasher 220, the content restrictor 225, and the rendering restrictor 230 of the presentation restrictor 165 can include or can be part of the client device 125, the proxy device 145, and the remote content restrictor device 150, a single module, or a logic device having one or more processing module. The resource parser 215, the element hasher 220, the content restrictor 225, and the rendering restrictor 230 of the presentation restrictor 165 can include or share one or more data processing apparatuses, computing devices, or processors, and be part of the client device 125, the proxy device 145, and the remote content restrictor device 150, a single module, or a logic device having one or more processing module.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to restricting content inserted into information resources and deploying countermeasures thereto, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A system for restricting content inserted into information resources, comprising: a computing device having one or more processors coupled with memory, configured to: select a content element included in an information resource to which to apply a content restriction policy for modifying presentation of the content element; identify a bit stream corresponding to the content element included in the information resource; hash the bit stream corresponding to the content element to generate an element identifier identifying the content element; access a restricted content database using the element identifier, including: access a local restricted content database stored on the computing device using the element identifier, determine, responsive to not finding the element identifier in the local restricted content database, that the content element is to be modified in accordance with a content rendering restriction extension based on rendering properties of the content element and the information resource, insert the element identifier into the local restricted content database responsive to determining that the content element is to be modified in accordance with the content rendering restriction extension, and transmit the element identifier to a remote restricted content database for storage, responsive to determining that the content element is to be modified in accordance with the content rendering restriction extension; modify the presentation of the content element on the information resource in accordance with the content restriction extension.

2. The system of claim 1, wherein the computing device is further configured to:
   permit transmission of an acknowledge response for the content element to a remote server; and
   delete the content element from the information resource subsequent to the transmission of the acknowledge response for the content element to the remote server.

3. The system of claim 1, wherein the computing device is further configured to insert a second content element positioned over the content element on the information resource as specified by the content restriction policy.

4. The system of claim 1, wherein the computing device is further configured to remove the content element from the information resource as specified by the content restriction policy.

5. The system of claim 1, wherein the computing device is further configured to set a visibility property of the content element to null as specified by the content restriction policy.

6. A method of restricting content inserted into information resources, comprising:
   identifying, by a computing device having one or more processors, a content element included in an information resource to which to apply a content restriction policy for modifying presentation of the content element;

identifying, by the computing device, a bit stream corresponding to the content element included in the information resource;

hashing, by the computing device, the identified bit stream to generate an element identifier corresponding to the content element;

accessing, by the computing device, a restricted content database using the element identifier, including:

accessing, by the computing device, a local restricted content database stored on the computing device using the element identifier, the local restricted content database including a first list of element identifiers to be permitted and a second list of element identifiers to be restricted, determining, by the computing device responsive to not finding the element identifier in the local restricted content database, that the content element is to be modified in accordance with a content rendering restriction extension based on rendering properties of the content element and the information resource, inserting, by the computing device, the element identifier into the second list included in the local restricted content database responsive to determining that the content restriction policy is to be applied to the content element in accordance with the content rendering restriction extension, and transmitting, by the computing device, the element identifier to a remote restricted content database for storage, responsive to determining that the content element is to be modified in accordance with the content rendering restriction extension; the method further comprising:

modifying, by the computing device, responsive to finding the element identifier in the restricted content database, the presentation of the content element on the information resource in accordance with the content restriction policy.

\* \* \* \* \*